United States Patent
Choi et al.

(10) Patent No.: US 9,898,774 B2
(45) Date of Patent: Feb. 20, 2018

(54) USER TERMINAL APPARATUS, DISPLAY APPARATUS, SERVER AND CONTROL METHOD THEREOF

(71) Applicant: SAMSUNG ELECTRONICS CO., LTD., Suwon-si (KR)

(72) Inventors: Sun Choi, Suwon-si (KR); Hyung-rae Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/858,465

(22) Filed: Apr. 8, 2013

(65) Prior Publication Data

US 2013/0268401 A1 Oct. 10, 2013

(30) Foreign Application Priority Data

Apr. 8, 2012 (KR) ........................ 10-2012-0036466

(51) Int. Cl.
*G06Q 30/00* (2012.01)
*G06Q 30/06* (2012.01)

(52) U.S. Cl.
CPC ......... *G06Q 30/0633* (2013.01); *G06Q 30/06* (2013.01); *G06Q 30/0641* (2013.01)

(58) Field of Classification Search
CPC .................................................. G06Q 30/0641
USPC ....................................................... 705/27.1
See application file for complete search history.

(56) References Cited

U.S. PATENT DOCUMENTS

| | | | |
|---|---|---|---|
| 8,683,384 B2 * | 3/2014 | De Luca | 715/835 |
| 2005/0177458 A1 | 8/2005 | Martineau et al. | |
| 2007/0179858 A1 | 8/2007 | Jennings | |
| 2008/0262928 A1 | 10/2008 | Michaelis | |
| 2011/0178889 A1 | 7/2011 | Abraham et al. | |
| 2011/0213678 A1 | 9/2011 | Chorney | |
| 2012/0253972 A1 * | 10/2012 | Oskolkov et al. | 705/26.8 |

FOREIGN PATENT DOCUMENTS

| | | |
|---|---|---|
| CN | 101802855 A | 8/2010 |
| CN | 102034200 A | 4/2011 |
| KR | 10-2010-0113923 A | 10/2010 |
| KR | 10-2011-0000714 A | 1/2011 |
| KR | 10-2011-0011226 A | 2/2011 |
| WO | WO 0127837 A2 * | 4/2001 |

OTHER PUBLICATIONS

Anonymous, IBM: New IBM Software Enriches Online Shopping; Allows Retailers to offer a more personalized shopping experience and extend reach to customers worldwide, Nov. 12, 2009, Normans Media Ltd (Year: 2009).*

(Continued)

*Primary Examiner* — Jason B Dunham
*Assistant Examiner* — Brittney N Miller
(74) *Attorney, Agent, or Firm* — Sughrue Mion, PLLC

(57) ABSTRACT

A user terminal apparatus is disclosed includes a memory and a processor that executes a method of providing an integrated wishlist including providing a graphical user interface (GUI) through which information on products selected from a plurality of different electronic commerce websites is received and integrating the information on the products into the integrated wishlist.

21 Claims, 41 Drawing Sheets

(56) References Cited

OTHER PUBLICATIONS

Communication from the European Patent Office dated Jul. 5, 2013 in counterpart European Application No. 13162742.4.
International Search Report for PCT/KR2013/002928 dated Jul. 26, 2013 [PCT/ISA/210].
Written Opinion for PCT/KR2013/002928 dated Jul. 26, 2013 [PCT/ISA/237].
Communication dated Nov. 6, 2014 issued by Australian Patent Office in counterpart Australian Patent Application No. 2013204856.
Communication dated Jan. 29, 2015, issued by the Australian Intellectual Property Office in counterpart Australian Application No. 2013204856.
Communication dated Aug. 19, 2015 issued by the European Patent Office in counterpart European Patent Application No. 13 162 742.4.
Communication dated Nov. 2, 2016, issued by the State Intellectual Property Office of P.R. China in counterpart Chinese Application No. 201380018965.7.
Communication dated Apr. 10, 2017, issued by the State Intellectual Property Office of P.R. China in counterpart Chinese Application No. 201380018965.7.
Communication dated Oct. 25, 2017, issued by the European Patent Office in counterpart European Application No. 13162742.4.
Communication dated Sep. 12, 2017, issued by the State Intellectual Property Office of People's Republic of China in counterpart Application No. 201380018965.7.

* cited by examiner

FIG. 8
(a) 300
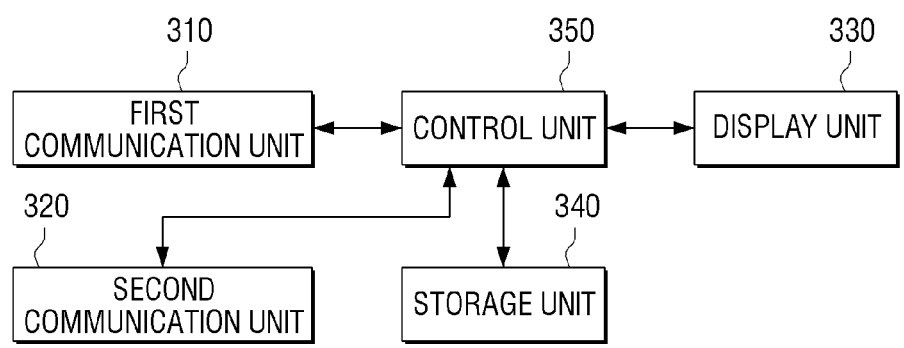
(b) 400
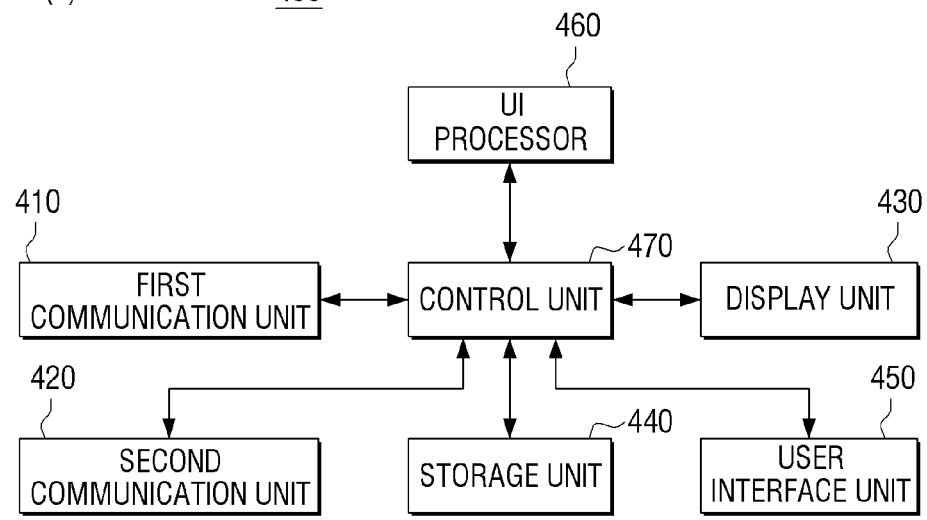

200

FIG. 16
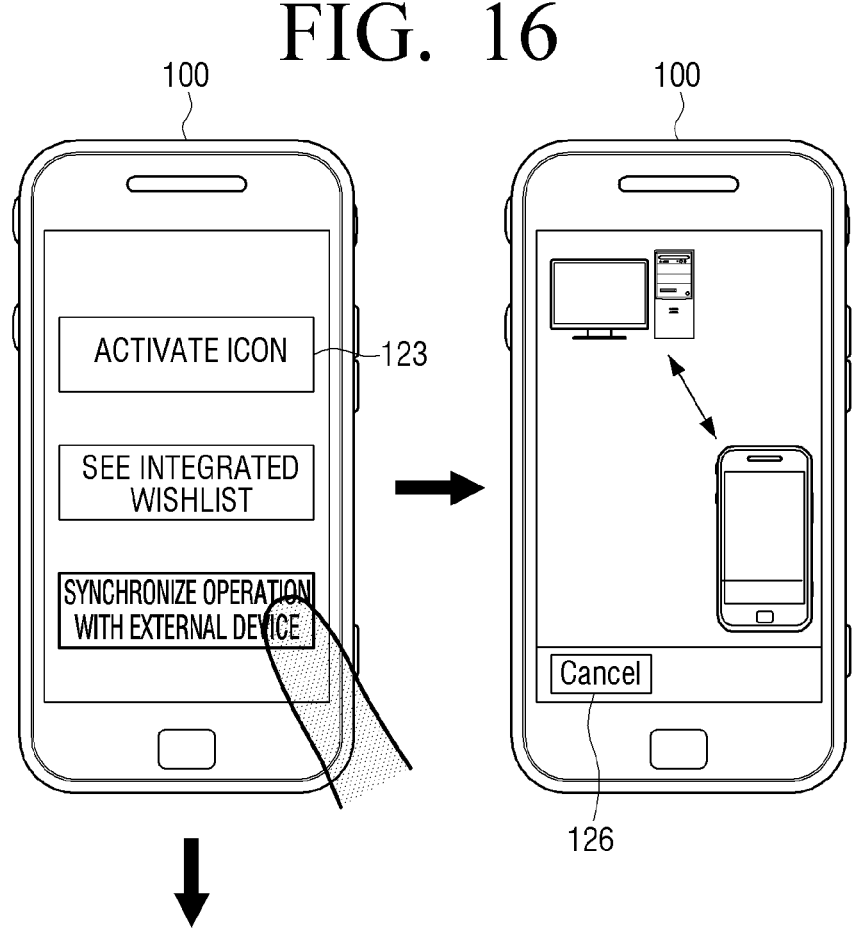
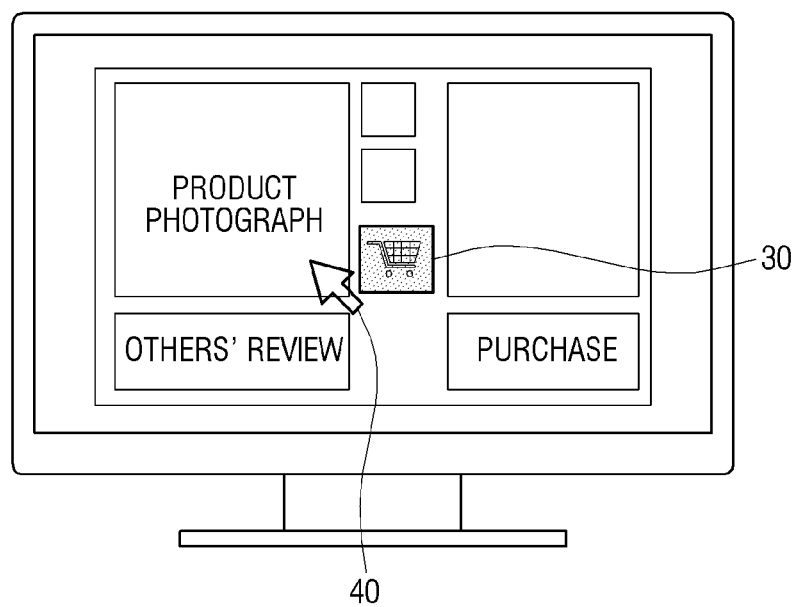

FIG. 33
(a)
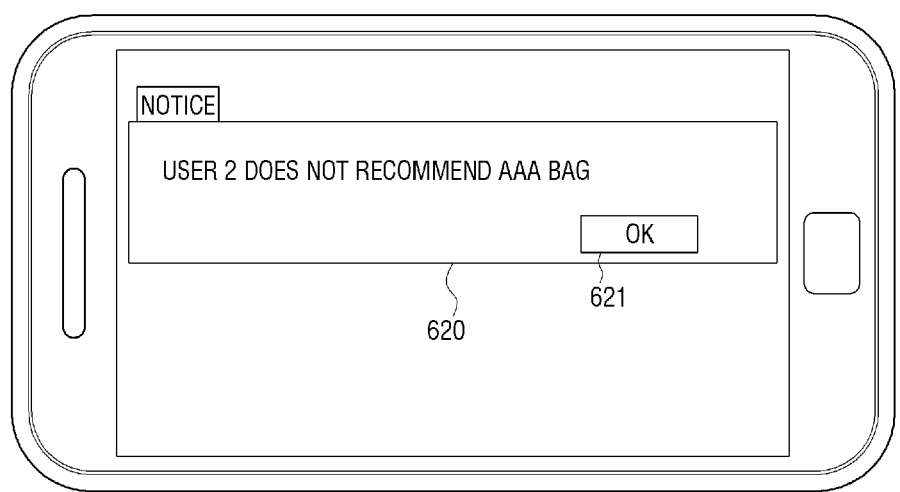
(b)
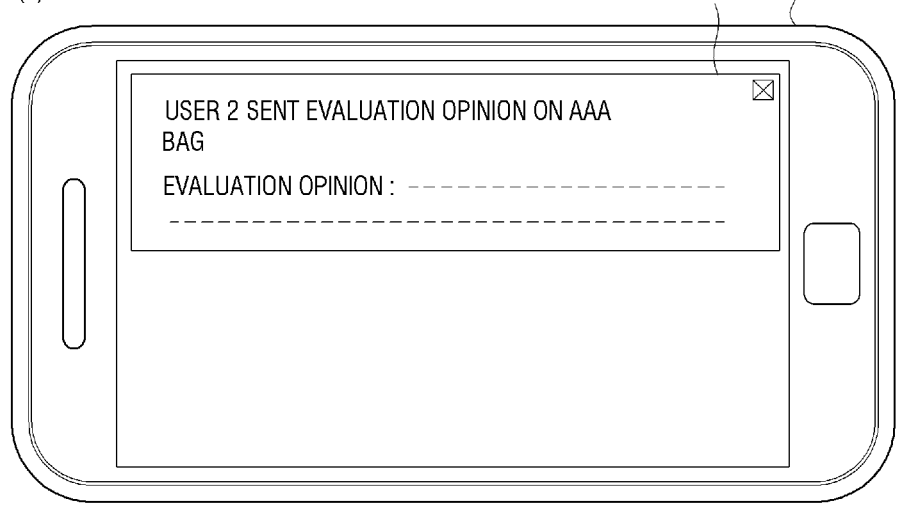

USER TERMINAL APPARATUS, DISPLAY APPARATUS, SERVER AND CONTROL METHOD THEREOF

CROSS-REFERENCE TO RELATED APPLICATIONS

This application claims priority from Korean Patent Application No. 10-2012-0036466, filed in the Korean Intellectual Property Office on Apr. 8, 2012, the disclosure of which is incorporated herein by reference.

BACKGROUND

1. Field

Methods and apparatuses consistent with exemplary embodiments relate to a user terminal apparatus, display apparatus, server, and control method thereof, and more particularly, to a user terminal apparatus which provides an integrated wishlist service, and a display apparatus, server, and control method thereof.

2. Description of the Prior Art

Due to development of electronic commerce, there is constant research on methods for efficiently performing electronic commerce.

A case in point is Internet shopping technology in which a user may purchase products through an Internet shopping mall. In this case, a user should visit a store and listen to explanation on each product before buying a product, but recently, there are many cases where a user may access a shopping mall through the Internet, check information on products through web pages, and purchase a product by directly making payments through the web pages.

One of the services provided by an Internet shopping mall is wishlist service. This service enables a buyer to register products that a user would buy in a server. However, such a service can be used only in the corresponding shopping mall. That is, there is a problem that the user could only purchase the products registered in the wishlist through the corresponding Internet shopping mall.

Accordingly, there is a need for a method to integrate and manage the products provided in different Internet shopping malls.

SUMMARY

Exemplary embodiments relate to a user terminal apparatus that provides an integrated wishlist service for managing objects provided through a plurality of different service provision servers through one application, a server, and a control method thereof.

According to an aspect of an exemplary embodiment, there is provided a user terminal apparatus including a display and a processor that controls the display to provide a graphical user interface (GUI) through which products are selected from a plurality of different electronic commerce websites, receives information on the products selected from the plurality of different electronic commerce websites, and integrates the information on the products into an integrated wishlist.

The integrated wishlist may be a compilation of the information on products desired by a user configured in a list.

The plurality of products may include a first product selected through the GUI by the user from a first electronic commerce website and a second product selected by the user through the GUI from a second electronic commerce website.

The first product may be selected by the user navigating to the first electronic commerce website and adding the first product to the integrated wishlist through the GUI and the second product may be selected by the user navigating to the second electronic commerce website and adding the second product to the integrated wishlist through the GUI.

The processor may control the display to display the integrated wishlist.

The processor may receive a request to purchase the plurality of products displayed in the integrated wishlist and process payment of the plurality of products through the plurality of different electronic commerce websites.

The processor may process payment of the first product through the first electronic commerce website and process payment of the second product through the second electronic commerce website.

The GUI may include a wishlist icon, and the processor may receive a first input through the GUI that selects the first product from the first electronic commerce website and associates the first product with the wishlist icon, add the first product to the integrated wishlist in response to receiving the first input, receive a second input through the GUI that selects the second product from the second electronic commerce website and associates the second product with the wishlist icon, and add the second product to the integrated wishlist in response to receiving the second input.

The first input may be a drag input that drags the first product to the wishlist icon and the second input may be a drag input that drags the second product to the wishlist icon.

The first input may be a drag input that drags the wishlist icon to the first product and the second input may be a drag input that drags the wishlist icon to the second product.

The GUI may include a wishlist icon that indicates products are available to be selected for inclusion in the integrated wishlist, and wherein the processor may receive a first input through the GUI that selects the first product from the first electronic commerce website, add the first product to the integrated wishlist if products are available to be selected for inclusion in the integrated wishlist in response to receiving the first input, receive a second input through the GUI that selects the second product from the second electronic commerce website, and add the second product to the integrated wishlist if products are available to be selected for inclusion in the integrated wishlist in response to receiving the second input.

According to an aspect of another exemplary embodiment, there is provided a method of providing an integrated wishlist including displaying a GUI through which products are selected from a plurality of different electronic commerce websites, receiving information on the products selected from the plurality of different electronic commerce websites, and integrating the information on the products into an integrated wishlist.

According to an aspect of another exemplary embodiment, there is provided a non-transitory computer-readable medium having embodied thereon a computer program that causes a terminal to execute a method of providing an integrated wishlist, the method including providing a GUI through which information on products selected from a plurality of different electronic commerce websites is received and integrating the information on the products into the integrated wishlist.

According to an aspect of another exemplary embodiment, there is provided a user terminal apparatus including a display and a processor that controls the display to provide a GUI through which products are selected from a plurality of different electronic commerce websites, receives information on the products selected from the plurality of different electronic commerce websites, and integrates the information on the products into an integrated shopping cart.

According to aspects of the exemplary embodiments, it becomes able to manage the wishlist function in an integrated manner, thereby increasing user convenience.

BRIEF DESCRIPTION OF THE DRAWINGS

The above and/or other aspects will be more apparent by describing certain exemplary embodiments with reference to the accompanying drawings, in which:

FIG. 8 is a block diagram illustrating a configuration of a user terminal apparatus and a display apparatus;

FIGS. 15 and 16 are views illustrating a UI screen;

FIGS. 31 to 36 are views for explaining a UI screen according to exemplary embodiments;

DETAILED DESCRIPTION OF EXEMPLARY EMBODIMENTS

Figure 1:
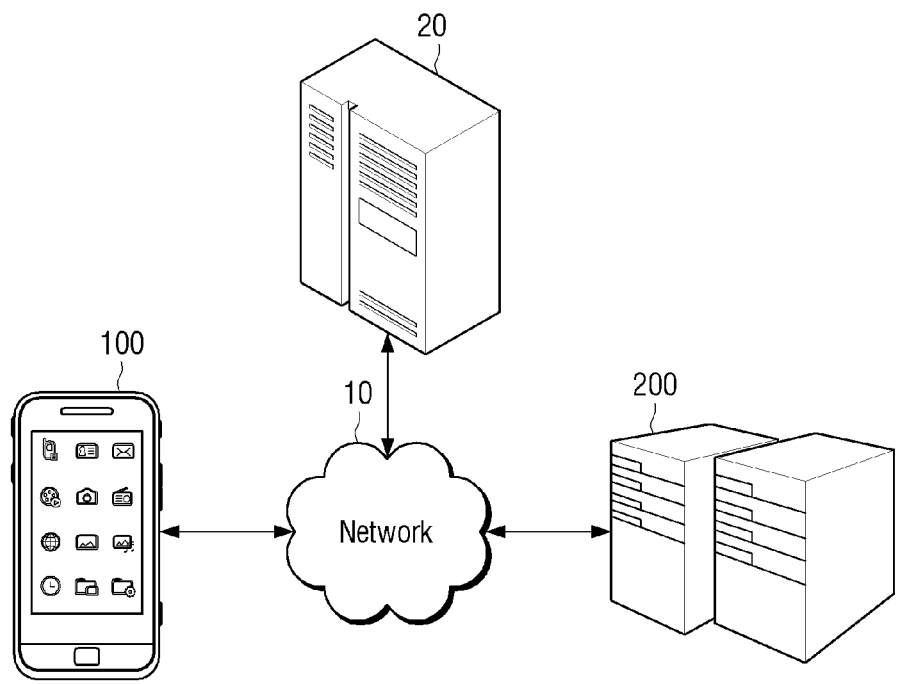
FIGS. 1 to 3 are views for explaining a network system according to exemplary embodiments.

Hereinafter, exemplary embodiments will be described with reference to the attached drawings. The exemplary embodiments may, however, be embodied in many different forms, and should not be construed as being limited to the exemplary embodiments set forth herein; rather, the exemplary embodiments are provided so that this disclosure will be thorough and complete, and will fully convey the concepts described herein to those skilled in the art. In the following description, well-known functions or constructions are not described in detail since they would obscure the descriptions with unnecessary detail, and like reference numerals in the drawings denote like or similar elements throughout the specification.

Figure 2:
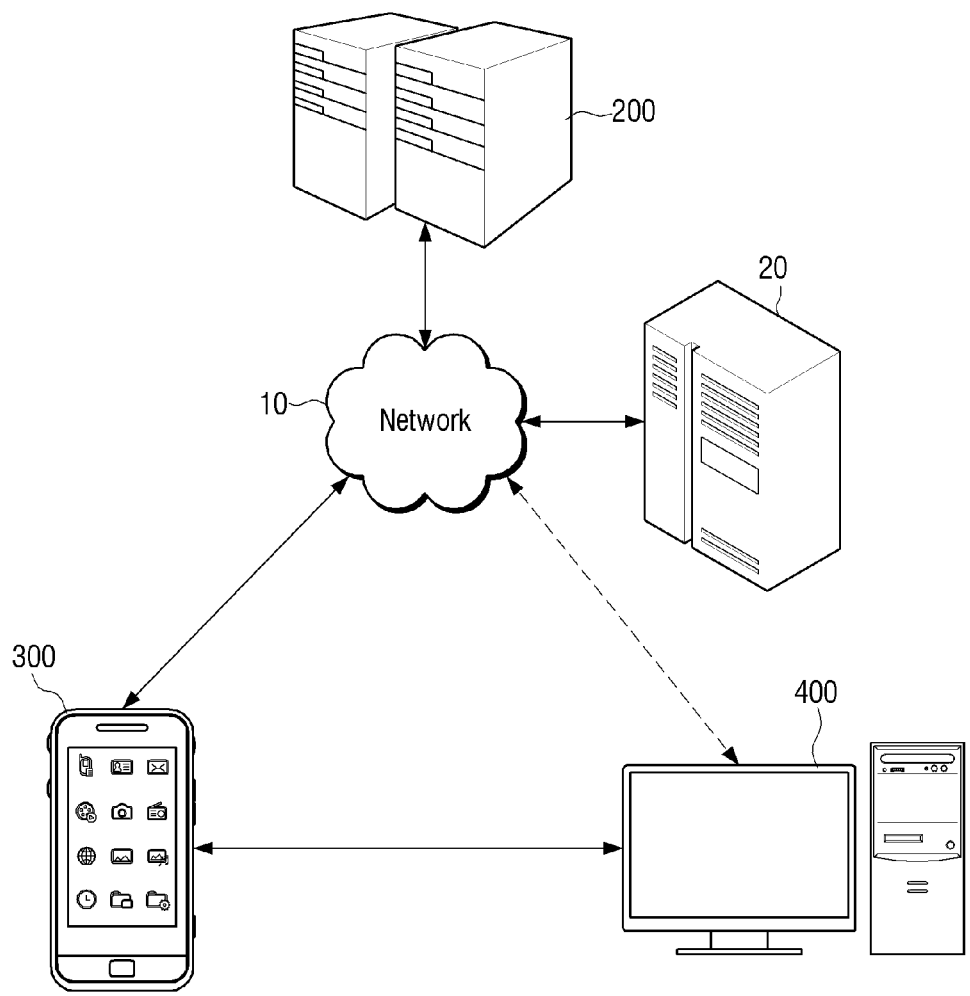
Figure 3:
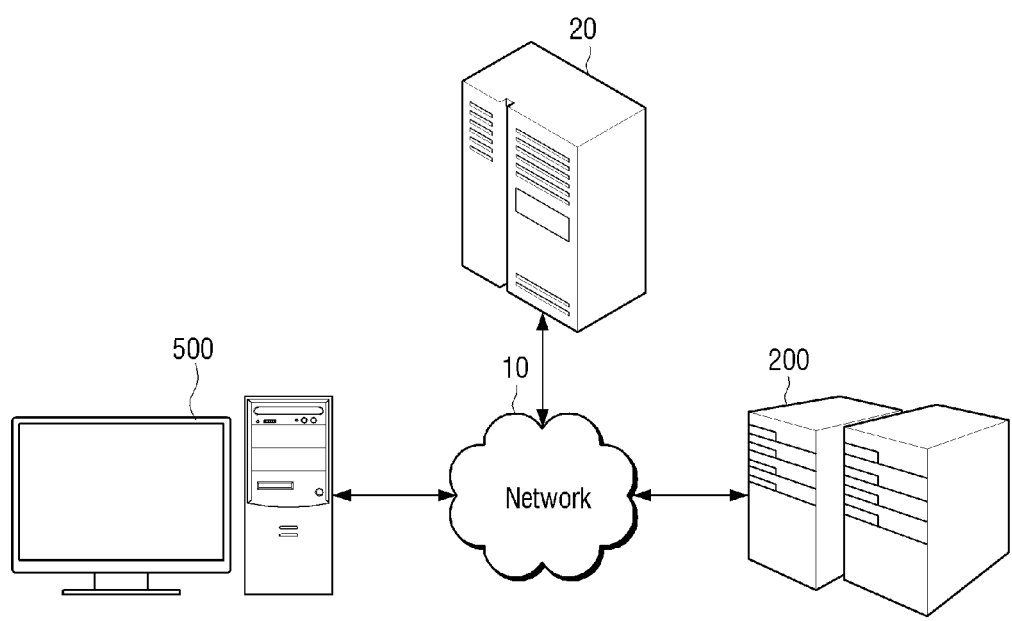

FIGS. 1 to 3 are views illustrating network systems according exemplary embodiments.

According to the exemplary embodiments, the network system may include a server, a user terminal apparatus, and a display apparatus, which will be explained below.

First Exemplary Embodiment

As illustrated in FIG. 1, the network system according to an exemplary embodiment may include a user terminal apparatus 100, server 200 and service provision server 20 connected over a network 10, such as the Internet.

The user terminal apparatus 100 may receive an integrated wishlist service by executing an application that provides an integrated wishlist function.

For example, the user terminal apparatus 100 may access the server 200, which provides the integrated wishlist service, by executing a client integrated wishlist application stored in the user terminal apparatus, such as a mobile phone, a tablet, and a PDA (Personal Digital Assistant).

More specifically, the user terminal apparatus 100 may log in to the server 200 by executing the corresponding integrated wishlist application, and receive the integrated wishlist service from the server 200. In some cases, executing an integrated wishlist application and logging in to the server 200 may be embodied as separate operations.

Herein, an integrated wishlist may refer to a list where information on an object selected by a user from among objects provided in a plurality of different service provision servers is recorded in an integrated manner. For example, the integrated wishlist may have a format where information on products provided by different shopping malls and selected by a user is received and stored in a single list, regardless of the different shopping malls and shopping mall server providing the products.

Such an integrated wishlist according to the present disclosure is different from a conventional wishlist, in which information on only the products provided in the shopping mall corresponding to the wishlist is recorded. On the other hand, information on products provided by different shopping malls is recorded as one list in the integrated wishlist.

The service provision server 20 may be an electronic commerce server. For example, it may be embodied as a web server that operates various types of online shopping malls, but is not limited thereto. Below, it is assumed that the service provision server 20 is a shopping mall web server (hereinafter referred to as a shopping mall server) for convenience of explanation.

If the shopping mall server is embodied as a web server, a user may access the shopping mall server through the user terminal apparatus 100. For example, the user may execute a web browser program, and then access a shopping mall server by either inputting a URL (Uniform Resource Locator) corresponding to each shopping mall server, or by selecting a link menu regarding the shopping mall server in a portal site. Accordingly, the user terminal apparatus 100 receives a web page provided in the shopping mall server and displays the web page.

The user may register object information provided through other shopping mall servers in one integrated wishlist, and not just object information provided through one shopping mall server. Accordingly, managing the object information provided through a plurality of shopping malls may be performed through one integrated wishlist.

A user's shopping information may be stored in an integrated wishlist whenever a user exits or closes an Internet shopping mall web page or whenever a user selects a product from an Internet shopping mall we page.

The server 200 may provide an integrated wishlist service according to an exemplary embodiment. More specifically, the server 200 may store and manage information on an object (i.e., product) added to the integrated wishlist, and provide corresponding information about the products in the integrated wishlist according to a request from the user terminal apparatus 100. The server 200 may be embodied as a social networking service (hereinafter referred to as SNS) server or a cloud computing server An SNS server refers to an online platform that creates and reinforces a social relationship through free communication and information sharing among users. In a case where a server 200 is embodied as an SNS server, the server 200 may transmit and receive messages or evaluation information regarding shopping events or products of related users having social networking relationships with one another regarding objects recorded in an integrated wishlist. For example, in a case where user A and user B are registered as friends, when user A adds a product "a" to the integrated wishlist of user A, it is possible for user B to request evaluation information on the corresponding product "a" using the integrated wishlist of user A and add the product "a" to the integrated wishlist of user B.

A cloud computing server refers to a server employing cloud computing technology, for example a software service based on a web used by storing a program in a server on the Internet and executing the program in a computer or mobile phone. In a case where the server 200 is embodied as a cloud server, the server 200 may be embodied to provide product information and additional services, such as a settlement service.

In addition, the server 200 may be embodied as an embedded server provided in an external server or user terminal apparatus 100.

In the aforementioned exemplary embodiments, it has been explained that a web page is received from a shopping mall server and is displayed on the user terminal apparatus 100, but it is also possible to provide product information in the format of a page provided through an application executed in the shopping mall server instead of a web page format.

Second Exemplary Embodiment

As illustrated in FIG. 2, the network system according to another exemplary embodiment may include a server 200, a user terminal apparatus 300, and a display apparatus 400.

The user terminal apparatus 300 may provide an integrated wishlist service by executing the integrated wishlist application in the same manner as the user terminal apparatus 100, but an object added to the integrated wishlist may be selected through the display apparatus 400.

More specifically, the display apparatus 400 may be synchronized with the user terminal apparatus 300, and may receive the integrated wishlist.

When an object is selected through the shopping mall web page displayed on the display apparatus 400 synchronized with the user terminal apparatus 300, the information on the selected object is stored in the integrated wishlist application stored in the user terminal apparatus 300. For example, when a product "a" is selected through the shopping mall web page and a product selecting signal is received by the user terminal apparatus 300 from the display apparatus 400, the user terminal apparatus 300 may request the service provision server 20, for example a shopping mall server for a product code and other information regarding product "a". In this case, the product code and other information regarding product "a" may be received from the shopping mall server and be stored in the server 200.

The user terminal apparatus 300 and display apparatus 400 may be synchronized through various communication methods such as BT (BlueTooth), WiFi, PAN, LAN, WAN, Wired I/O, NFC Interface, RFID Tag, IR Interface, and USB (Universal Serial Bus). When the integrated wishlist application is executed in the user terminal apparatus 300, peripheral devices may be searched for through DLNA (Digital Living Network Alliance), and when the device to be synchronized is selected of among the searched devices, a pairing may be performed. A pairing may also be performed using various communication methods, such as BT (BlueTooth) and NFC Interface, but a detailed explanation thereof is omitted.

The user terminal apparatus 300 and display apparatus 400 may be synchronized through other communication methods, such as generating a network communication channel.

When the user terminal apparatus 300 and display apparatus 400 are synchronized, the user terminal apparatus 300 may request the display apparatus 400 to display an object on the display apparatus 400. The displayed object notifies a user that an integrated wishlist function is being executed. The object may be a wishlist icon. Accordingly, the object may be displayed on a web page when a user browses a web page, indicating that the integrated wishlist function is active and permitting a user to access functions of the integrated wishlist.

Third Exemplary Embodiment

As illustrated in FIG. 3, the system includes a network system server 200 and a display apparatus 500.

The display apparatus 500 may access the server 200 to receive an integrated wishlist service. The display apparatus 500 may be a PC, a digital TV, or a notebook PC.

The user inputs user information through the display apparatus 500 to create an account for receiving an integrated wishlist service, and receives an integrated wishlist service through the corresponding account. The user may input authentication information, for example user ID and password, to log in to the server 200. It is possible to automatically log in to the server by executing the integrated wishlist application stored in the display apparatus 500. In this case, it is necessary for the user to install the integrated wishlist application in the display apparatus 500, and log in to the server 200 through the integrated wishlist application.

The server 200 may provide various data related to the integrated wishlist service in the same manner as discussed above.

The server 200 may store and manage information on an object added to the integrated wishlist, and provide corresponding information about the object according to a request from the display apparatus 500.

For example, the server 200 may receive information on a product selected through a shopping mall web page displayed on the display apparatus 500 from the service provision server 20, for example the shopping mall server, and store the received information in a list format. When a request of the display apparatus 500 is received, the corresponding list may be provided.

The exemplary embodiments illustrated in FIGS. 1 to 3 are mere exemplary, and some or all of the elements and functions described above may be combined.

Figure 4:
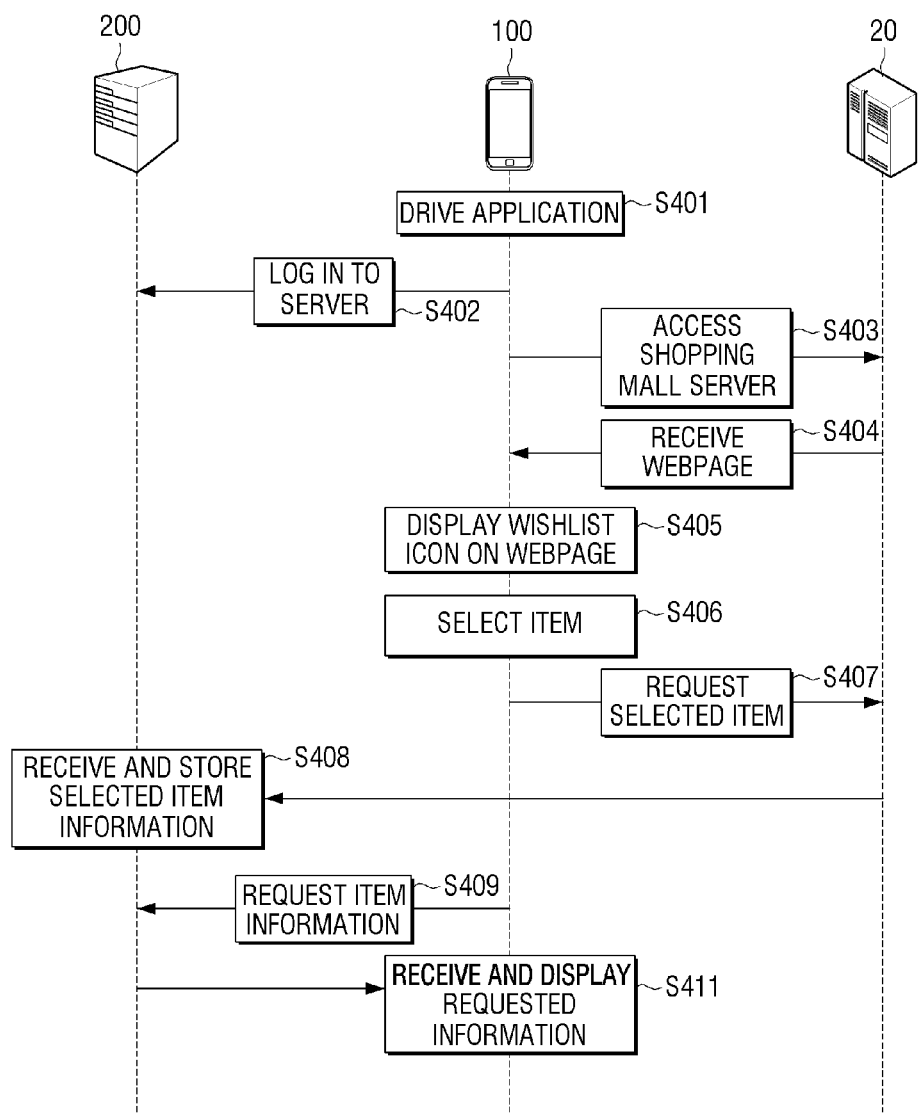
FIG. 4 is a view for explaining an operation of a network system illustrated in FIG. 1.

FIG. 4 is a view for explaining an operation of the network system illustrated in FIG. 1. It is assumed the service provision server 20 is a shopping mall web server for convenience of explanation.

According to FIG. 4, the user terminal apparatus 100 executes the integrated wishlist application (S401). The integrated wishlist application may be executed under control of an operating system (OS) of the use terminal apparatus 100.

The user terminal apparatus 100 logs in to the server 200 (S402). That is, the user terminal apparatus 100 may perform user authentication when executing the integrated application wishlist. However, the user terminal apparatus 100 may perform authentication with the server 200 without executing the integrated application wishlist.

The user terminal apparatus 100 accesses the shopping mall server 20 (S403), and receives a web page (S404). More specifically, the user terminal apparatus 100 may receive a web page consisting of a video file, HTML (or XHTML), CSS, java script, picture, flash stored in the shopping mall server through the web browser. The user terminal apparatus 100 may receive the web page through an HTTP protocol and display the web page on a display of the user terminal apparatus 100.

The order of steps S401 and S402 for driving the application and logging in to the server and the steps S403 and S404 for accessing the shopping mall server and receiving the web page may be changed.

The user terminal apparatus 100 displays an object on the display that indicates the integrated wishlist function is active. The object may be displayed on the received web page, for example as a wishlist icon (S405). In this case, in an OS system which adopts a touch operation for receiving input, such as a smart phone, tablet PC, etc., the wishlist icon may be displayed on a different layer of a display than the web page, or may be positioned on a same region of the display as the user manipulates positioning of web page on the display.

However, in a system that adopts a cursor for receiving input, such as a PC, the wishlist icon may be displayed on a different layer from the web page near the display location of the cursor, or may be displayed to track the location of the cursor. For example, the wishlist icon may be displayed based on the moving location and direction of the cursor to track the cursor.

Otherwise, instead of displaying the cursor and additional wishlist icon, the shape of the cursor itself may be changed for implementing the integrated wishlist, for example, by changing an arrow shape cursor into a basket shape cursor for selecting products to be added to the integrated wishlist.

Detailed explanation thereof will be made hereinafter with reference to the figures.

When an item is selected on the web page (S406), the user terminal apparatus 100 requests the shopping mall server 20 for information on the selected item (S407). In this case, the shopping mall server 20 may store information on the item requested by the user. Accordingly, when information on a stored item is changed, the shopping mall server 20 becomes able to notify the user terminal apparatus 100 of the changed information on the product. In addition, the shopping mall server 20 may store user authentication information and information on an item associated with the user authentication information.

The server 200 receives information on a selected object from the shopping mall server 20 and stores the information according to a control of the user terminal apparatus 100 (S408). That is, the user terminal apparatus 100 may add a product to the integrated wishlist, the shopping mall server 20 may store information on the item added to the integrated wishlist in the server 200, and thereby manage the stored information in the integrated wishlist. The server 200 may receive information on a product provided by the corresponding shopping mall server 20 and store the received information, but may receive only the information selected by the user and manage the selected information. For example, in a case where the user selected only an image and price of a product on a web page, the server 200 may receive only the corresponding information and manage the received information, instead of all product information about a product. Instead of storing product information of the integrated wishlist on the server 200, it is also possible to store the product information of the integrated wishlist in a memory provided in the user terminal apparatus 100.

Next, the user terminal apparatus 100 requests the server 200 for item information registered in the integrated wishlist according to a user command (S409), receives the requested information, and displays the received information (S411). For example, when the integrated wishlist application is executed or an integrated wishlist read command is received, the user terminal apparatus 100 may request the server 200 for the integrated wishlist information, or use the information stored in the memory (not illustrated) to display the products stored in the integrated wishlist. The integrated wishlist may be displayed in a list format in which products of the integrated wishlist are displayed in the order in which the products were selected, or according to product types, etc. It is also possible to provide a search UI for searching the products stored in the integrated wishlist.

Detailed explanation on the operations performed in each step will be made with reference to the block diagram hereinbelow.

Figure 5:
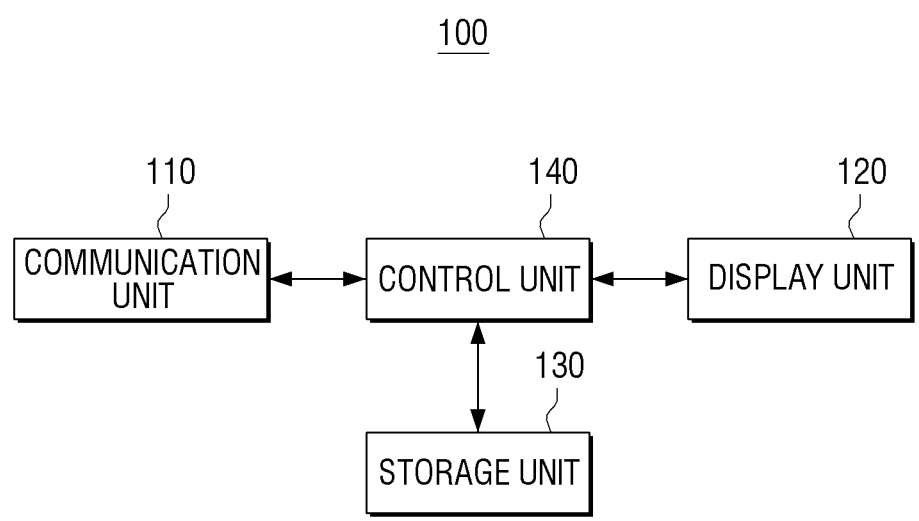
FIG. 5 is a block diagram illustrating a configuration of a user terminal apparatus.

FIG. 5 is a block diagram illustrating a configuration of the user terminal apparatus 100 illustrated in FIG. 4.

According to FIG. 5, the user terminal apparatus 100 includes a communication unit 110, a display unit 120, a storage unit 130, and a control unit 140.

The user terminal apparatus 100 may be embodied as a mobile phone, such as a smart phone, a PDA (Personal Digital Assistants), a PMP (Portable Multimedia Player), and a (tablet) PC, and may communicate with the server 200.

The communication unit 110 may perform communication with a plurality of different service provision servers through a network. More specifically, the communication unit 110 may perform communication with the plurality of service provision servers using various service protocols, such as TCP/IP (Transmission Control Protocol/Internet Protocol), HTTP (HyperText Transfer Protocol), HTTPS (Hypertext Transfer Protocol over Secure Socket Layer), SOAP (Simple Object Access Protocol), and XML-RPC (XML Remote Procedure Call).

In addition, the communication unit 110 communicates with the server 200 through the network.

The communication unit 110 transmits and receives information so that product information in the integrated wishlist can be managed through the server 200. For example, when a user command for checking the information recorded in the integrated wishlist is received, it is possible to receive corresponding product information about products in the integrated wishlist and display the product information on the display unit 120.

The display unit 120 may provide various display screens generated by the user terminal apparatus 200.

Especially, the display unit 120 displays an object that indicates that the integrated wishlist function is active, for example an wishlist icon, and displays UI screens according to the wishlist service. Detailed explanation on a UI screen will be made with reference to views hereinbelow.

More specifically, the display unit 120 may access a shopping mall server, and when a shopping mall web page is displayed, may display a wishlist icon on the corresponding web page.

In addition, the display unit 120 may change information on an object recorded in the integrated wishlist and display the changed information according to a predetermined event.

In addition, the display unit 120 may add an update mark to a corresponding icon and display the result, in a case where there is update information in the integrated wishlist.

The display unit 120 may be embodied as a screen of a touch pad. The touch screen may be configured to detect a touch input location, a touch input size area, and a touch input pressure.

The storage unit 130 is a storage medium in which various programs necessary for operating the user terminal apparatus 100 are stored. The storage unit may be a memory, such as a HDD (Hard Disk Drive). For example, the storage unit 130 may have a ROM for storing a program for operating the control unit 140, and a RAM for temporarily storing data according to operating the control unit 140. In addition, the storage unit 130 may include an EEROM (Electrically Erasable and Programmable ROM) for storing various reference data.

The storage unit 130 may store the integrated wishlist application, and in some cases, may store partial information on the integrated wishlist service.

Information related to the integrated wishlist service may be stored and managed through the server 200, but information frequently used through the corresponding application may be stored in the storage unit 130 and be managed. For example, UI layout information related to the corresponding application, and product information frequently recorded through the integrated wishlist may be managed through the storage unit 130.

The user terminal apparatus 100 may receive an integrated wishlist application from a network from an external memory (not illustrated), or from an internal memory. An internal memory (not illustrated) may include a computer memory, such as a RAM (Random Access Memory), flash memory, and ROM (Read Only Memory), but is not limited thereto. Likewise, the external memory (not illustrated) may include an HDD (Hard Disk Drive), CD (Compact Disc) ROM, memory card, and USB (Universal Serial Bus) flash drive, but is not limited thereto.

The control unit 140 controls the overall operation of the user terminal apparatus 100. Functions of the control unit 140 will be explained per operation for convenience of explanation. In addition, for convenience of explanation, the service provision server will be explained as a shopping mall server, and an object for inclusion in the integrated wishlist will be explained as a product.

The user terminal apparatus 100 may execute the integrated wishlist application and log in to the server 200. However, in some cases, when an application is not logged in to the server 200, an additional log in process may be required.

For convenience of explanation, a case where an application is executed will be explained in the same manner as the case where an application is logged in to the server 200.

The control unit 140 may control various operations of the user terminal apparatus according to an execution state of the application.

In a case where the control unit 140 accesses the shopping mall server while the application is executed and the shopping web page is displayed, the control unit 140 may control display of the wishlist icon on the shopping mall web page.

On the other hand, in a case where the corresponding application is executed while the shopping mall web page is displayed, the control unit 140 may display a wishlist icon when converting to the web page for display in an application execution screen or through a refreshing on the web page.

The control unit 140 may control display of the wishlist icon in various formats.

For example, the control unit 140 may display a wishlist icon having a predetermined transparency on the screen to overlay the wishlist icon on the shopping mall web page.

In addition, the control unit 140 may display the wishlist icon in a nontransparent state on one portion of a screen area where a touch has been input according to a user's touch manipulation. That is, the control unit 140 may control the wishlist icon to track the user's touch manipulation and display the wishlist icon.

Otherwise, the control unit 140 may display the wishlist icon on a predetermined area (for example, on a corner area in the lower right side) of the screen.

Registering a Product in the Integrated Wishlist

In a case where there is a predetermined manipulation regarding the wishlist icon corresponding to a product image or product information, the control unit 140 may add information on the corresponding product to the integrated wishlist. In this case, the product information may include various information, such as a representative product image, an image of a product, an thumbnail image of a product, product name text, product price, a product advertisement, and a product preview, etc. When storing an image of a product, a representative image may not be stored. In addition, when storing a thumbnail image, a detailed product image may not be stored. Pricing information may be stored, including information on available coupons, shipping charges, or information on a final settlement prices.

In addition, product information may differ depending on the product type. For example, in the case of a general shopping mall, there may be a product mall name, product name, price, and coupon, and in the case of a media contents shopping mall or a music contents, there may be a product mall name, singer name, song name, album information, price, and in a case of image contents, there may be a product mall name, title, broadcasting station, broadcasting date, and price.

The product information may also include information on an offline store at which the product is available, for example, location of an offline store, store name, price information on the corresponding store, and product name.

In a case where there is a touch manipulation on a product image or the wishlist icon displayed on product information, or in a case where there is a touch and drag manipulation on a wishlist icon displayed on a predetermined area in the product image or product information, the corresponding product may be added to the integrated wishlist.

For example, in a case where there is a touch and hold manipulation on a particular area on a shopping mall web page, the control unit 140 may change at least one of a shape and color of the wishlist icon, and in a case where there is a swipe operation in the changed state, the control unit 140 may added the corresponding product to the integrated wishlist.

The control unit 140 may control the server 200 to receive information on the product provided in the corresponding shopping mall server and store and manage the received information.

The control unit 140 may receive only the information that the user selected in the user terminal apparatus 100 and may manage only the received information. For example, in a case where the user selected only an image and price of a product on the web page, the user terminal apparatus 100 may receive and manage only the corresponding information.

In addition, in a case of receiving product information through NFC, RFID technology in an offline store, the control unit 140 may transmit the received information to the server 200 and register the information in the integrated wishlist.

The control unit 140 may change the format of the wishlist icon and display the wishlist icon according to the information recorded in the integrated wishlist.

More specifically, the control unit 140 may change the format of the wishlist icon (for example, color, transparency, outline) so that a number of objects contained in the integrated wishlist and an update state of the objects may be reflected.

For example, it is possible to display the number of objects and update objects on one side of the icon in a mark format, or in a format where the objects are accumulated. Otherwise, display of the number of objects and update objects may also be displayed such that transparency decreases as the number of objects increases, or darkness increases as the number of objects increases.

In addition, the control unit 140 may change the format of the wishlist icon and display the result in the user manipulation state on the screen.

More specifically, the control unit 140 may change the color, transparency, outline of the wishlist icon and display the result according to the user's manipulation, such as a touch and hold manipulation, or drag manipulation etc.

Meanwhile, the control unit 140 may make the wishlist icon automatically disappear when execution of the corresponding application ends.

In addition, when the shopping mall web page screen is closed, and a new web page screen is displayed, the control unit 140 may make the wishlist icon disappear.

In addition, when there is no user manipulation regarding the corresponding icon during a predetermined period of time after the wishlist icon is displayed, the control unit 140 may make the wishlist icon disappear.

The control unit 140 may reconfigure the UI screen into various formats and display the result according to the execution state of the corresponding application.

More specifically, when there is an integrated wishlist view command, the control unit 140 may display the objects stored in the integrated wishlist for viewing by the user.

For example, the control unit 140 may provide the objects contained in the integrated wishlist in a list format where the objects are displayed in the order in which the objects were accumulated in the integrated wishlist.

Furthermore, the control unit 140 may provide the objects contained in the integrated wishlist in different lists according to the product type.

In addition, the control unit 140 may provide information on a plurality of shopping mall servers, providing the same object contained in the integrated wishlist, in a list format. Accordingly, the user may become able to compare information about a same product available from the plurality of shopping malls. For example, the user may compare the price of the product available from different electronic commerce sites.

In addition, the control unit 140 may provide a search UI for searching the objects contained in the integrated wishlist.

When updated information regarding an object in the integrated wishlist is received from the server 200 or the service provision server 20, the control unit 140 may output a sound, vibration (haptic), a message on the UI, or display a popup window.

In addition, the control unit 140 may indicate that an update has been made by ordering the updated product to be at the front of the integrated wishlist, highlighting information on the object which has been updated on the integrated wishlist, or changing the format of the wishlist icon.

In addition, in a case where the server 200 is embodied as an SNS server, it may be possible to display a message on the SNS page.

The control unit 140 may end the integrated wishlist service by closing the corresponding integrated wishlist application according to a user's command.

That is, the user may manually end the corresponding integrated wishlist application to end the integrated wishlist service, but it may also be possible to automatically end the corresponding integrated wishlist application when a predetermined event occurs.

For example, when a user executes another application, or when a user visits another web page other than the shopping mall web page for or more than a predetermined time, the control unit 140 may automatically end the corresponding integrated wishlist application.

Figure 6:
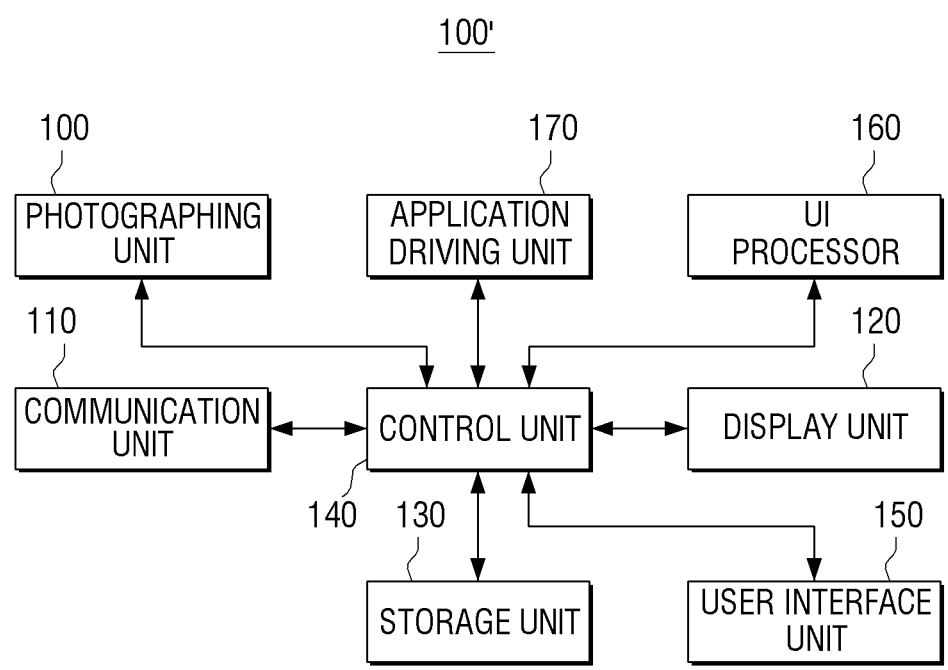
FIG. 6 is a block diagram illustrating a detailed configuration of a user terminal apparatus.

FIG. 6 is a block diagram illustrating a detailed configuration of a user terminal apparatus illustrated in FIG. 5.

According to FIG. 6, the user terminal apparatus 100' may further include a user interface unit 150, UI processor 160, application driving unit 170 and photographing unit 180, in addition to the elements illustrated in FIG. 5. Of the elements illustrated in FIG. 6, those that have been illustrated in FIG. 5 have similar functions, and thus redundant explanation thereof will be omitted.

The user interface unit 150 is an input means for receiving an input user command and delivering the user command to the control unit 140. The user interface 150 may be embodied as an input panel. Herein, the input panel may be a key pad or touch screen having a touch pad or various functional keys, number keys, and letter keys.

More specifically, the user interface unit 150 may receive various user commands for controlling integrated wishlist services. For example, the user interface unit 150 may receive a user command for executing or terminating the integrated wishlist application, or a user command for manipulating various UI screens related to the integrated wishlist service.

The UI processor 160 may create various types of GUI.

In addition, the UI processor 160 generates various UI screens in 2D or 3D format. Herein, the UI screen may be a screen related to executing the integrated wishlist application. In addition, the UI screen may be a screen having a menu screen and a message screen.

In addition, the UI processor 160 may perform operations such as 2D/3D conversion, transparency, color, size, format and location adjustment, highlight, animation on UI elements.

For example, the UI processor 160 may display the wishlist icon displayed on the screen in various formats.

The application driving unit 170 executes an application provided in the user terminal apparatus 100'. Herein, the application may be a multimedia application for reproducing multimedia contents The 'multimedia contents' include information on text, audio, still image, animation, video, interactivity contents, EPG (Electronic Program Guide) contents from a contents provider, electronic message received from users, and information on current events etc., but is not limited thereto.

The photographing unit 180 may include a camera and perform a photographing function.

The photographing unit 180 may be embodied as a general camera, but in some cases, the photographing unit 180 may be embodied to include at least one of a depth camera and color camera.

In some cases, the photographing unit 180 may perform a function of recognizing a user motion or a user recognition function. For example, the photographing unit 180 may recognize a user motion for executing the integrated wishlist and deliver the function for executing the integrated wishlist to the control unit 140.

Besides the above, the user terminal apparatus 100' may further include an image receiving unit (not illustrated) that receives a 2D or 3D image signal received from a broadcasting station or satellite and demodulates the received image signal, and an image processor (not illustrated) that performs additional signal processing operations and GUI (Graphic User Interface) that performs video decoding, format analysis, and video scaling.

Figure 7:
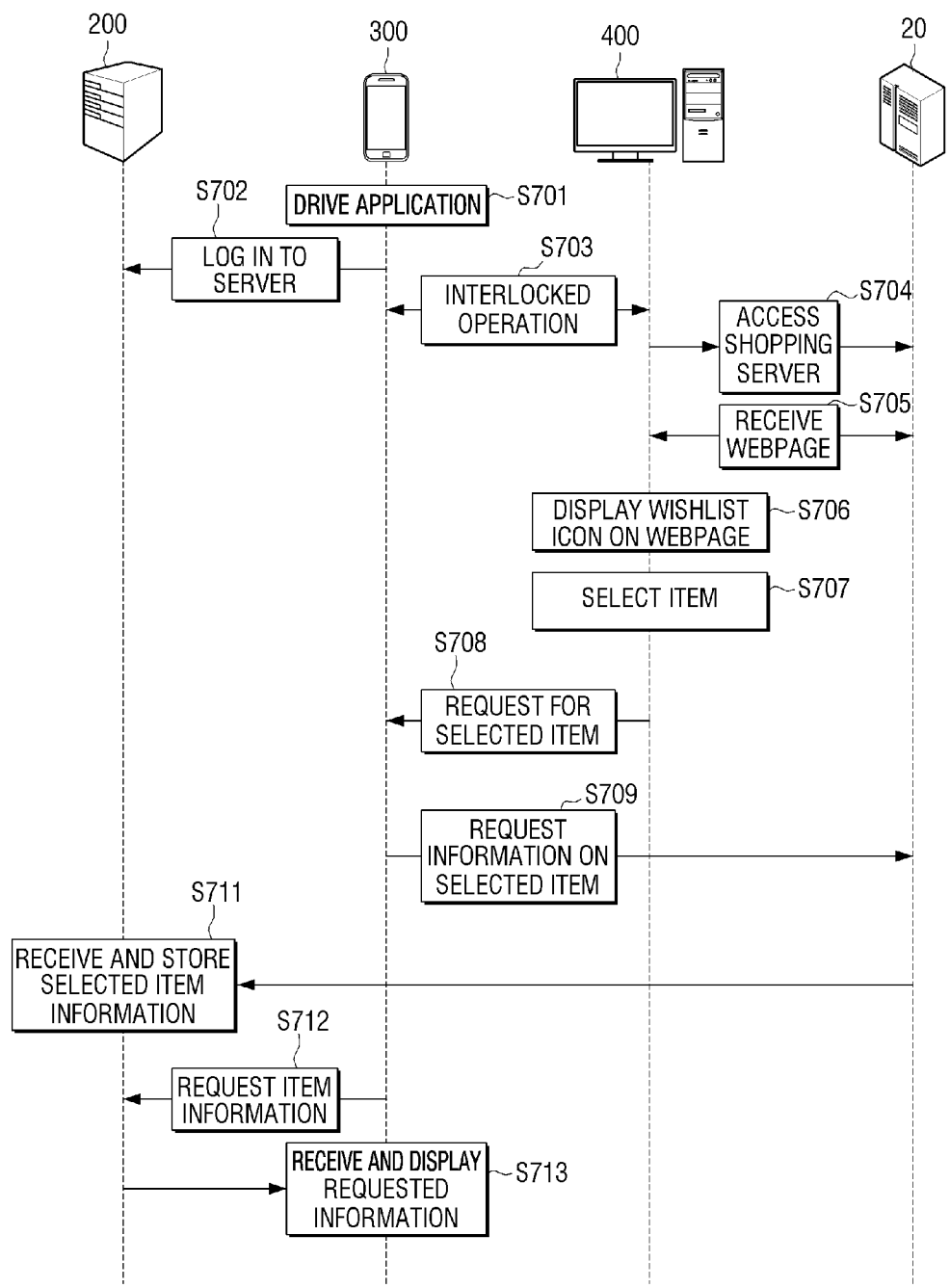
FIG. 7 is a view for explaining an operation of a network system.

FIG. 7 is a view for explaining operations of the network system illustrated in FIG. 2. For convenience of explanation, it is assumed the service provision server is a shopping mall web server.

According to FIG. 7, the user terminal apparatus 300 executes the integrated wishlist application (S701). In this case, the user terminal apparatus 300 automatically logs in to the server 200 (S702). However, in a case where the application does not automatically log in to the server 200, an additional log in process may be required.

In addition, the user terminal apparatus 300 and display apparatus 400 may be synchronized with each other according to the execution of the integrated wishlist application (S703). For example, when the integrated wishlist application is executed by the user terminal apparatus 300, the user terminal apparatus 300 searches peripheral for devices through DLNA (Digital Living Network Alliance) technology, and when a connected device is selected from among the searched devices, pairing may be performed to establish the synchronized state. In this case, the user terminal apparatus 300 may provide a UI screen for selecting a device to synchronize the searched peripheral devices.

Next, the display apparatus 400 accesses the shopping mall server 20 (S704), and receives a web page (S705).

Although illustrated in the order of FIG. 7, the order of steps S701 to S705 may be changed.

Next, the display apparatus 400 displays an object on the web page indicating that the integrated wishlist function is active For example, a wishlist icon (S706) may be displayed. In this case, the wishlist icon may track the location of the cursor displayed on the screen, or may be displayed in a format of changing the shape of the cursor.

When an item is selected on a web page (S707), the display apparatus 400 requests the user terminal apparatus 300 to add the selected item to the integrated wishlist (S708). In this case, the user terminal apparatus 300 requests the shopping mall server 20 for information about the selected item (S709).

The server 200 receives information on the selected object from the shopping mall server 20 and stores the received information according to control by the user terminal apparatus 300 (S711).

Next, the user terminal apparatus 300 requests the server 200 for item information registered in the integrated wishlist according to a user command (S712), receives the requested information, and displays the received information (S713).

Other operations performed in each step will be explained with reference to the block diagram hereinbelow.

FIG. 8 is a block diagram illustrating a configuration of the user terminal apparatus 300 and display apparatus 400 illustrated in FIG. 7.

According to FIG. 8(*a*), the user terminal apparatus 300 includes a first communication unit 310, second communication unit 320, display unit 330, storage unit 340, and control unit 350. Detailed explanation of elements previously described with reference to FIG. 7 will be omitted.

The first communication unit 310 communicates with a plurality of service provision servers and server 200 through a network. Functions of the first communication unit 310 are the same as the communication unit 110 disclosed in FIG. 7, and thus detailed explanation will be omitted.

The second communication unit 320 communicates with an external display apparatus 400. Herein, the display apparatus 400 may display a wishlist icon on a shopping mall web page according to an execution state of the integrated wishlist application executed by the user terminal apparatus 300.

More specifically, when a particular object is selected through the wishlist icon displayed on the display apparatus 400, the second communication unit 320 may receive the corresponding selected information. In this case, the user terminal apparatus 300 manages the information on the received object through the server 200 in the same manner as the first exemplary embodiment.

To communicate with the display apparatus 400, the second communication unit 320 may use NFC (Near Field Communication), BT (BlueTooth, internet, LAN, WI-FI (Wireless Fidelity), Ethernet, TCP/IP, IPX, Firewire, IEEE 1394, iLink, CDMA, TDMA, HDMI-CEC (High Definition Multimedia Interface), Wireless HDMI-CEC, RF (Radio Frequency), and RFID Tag methods.

The display unit 330 may provide various display screens according to an execution state of the integrated wishlist application.

Specifically, the display unit 330 displays information and UI screens provided through the integrated wishlist service according to the execution state of the corresponding integrated wishlist application. Detailed explanation on the UI screen will be made hereinbelow with reference to the figures.

The storage unit 340 is a storage medium in which various programs necessary for operating the user terminal apparatus 300 are stored. Information stored in the stored in the storage unit 340 is the same as the information stored in the storage unit 130 in the exemplary embodiment illustrated in FIG. 7, and thus detailed explanation thereof is omitted.

The control unit 350 controls the overall operations of the user terminal apparatus 300. Functions of the control unit 350 will be explained per operation for convenience of explanation. In addition, functions that have already been explained with reference to FIG. 7 will be omitted.

The control unit 350 may synchronize the user terminal apparatus 300 with the display apparatus 400 according to the execution state of the integrated wishlist application.

For example, when the integrated wishlist application is executed and a menu for synchronizing the display apparatus 400 is selected, the control unit 350 may communicate with the display apparatus 400 through the second communication unit 320. In some cases, it is also possible to automatically synchronize with the display apparatus through NFC tagging or by executing the application without selecting a menu. The synchronization operation between the user terminal apparatus 300 and the display apparatus 400 may include a pairing operation, as discussed above.

The control unit 350 may configure the UI screen according to the execution state of the corresponding integrated wishlist application and display the UI screen.

More specifically, when there is an integrated wishlist view command, the control unit 350 may display the objects stored in the integrated wishlist for viewing by the user.

For example, the control unit 350 may display the objects contained in the integrated wishlist in a list format according to an order in which the products were added to the integrated wishlist.

In addition, the control unit 350 may provide the objects contained in the integrated wishlist in a list format according to product types.

In addition, the control unit 350 may provide information on the plurality of shopping mall servers providing a same object contained in the integrated wishlist, so that the user may compare the information of the plurality of shopping malls for the same object.

The control unit 350 may provide the search UI for searching objects contained in the integrated wishlist.

The control unit 350 may terminate the integrated wishlist application according to a user command, or automatically end the integrated wishlist application when a predetermined event occurs.

In addition, the control unit 350 may automatically end execution of the integrated wishlist application according to the event occurring in the display apparatus 400, for example in a case where there is a request to end the corresponding service from the display apparatus 400, where an event is not received for or more than a predetermined period of time from the display apparatus 400, where the display apparatus 400 is on a waiting state, or where power of the display apparatus 400 is turned off.

According to FIG. 8(b), the display apparatus 400 includes a first communication unit 410, second communication unit 420, display unit 430, storage unit 440, a user interface unit 450, a UI processor 460, and control unit 470.

Herein, the display apparatus 400 may be embodied as a PC, digital TV, and notebook PC.

The first communication unit 410 communicates with the service provision server through a network. In addition, in some cases, the first communication unit 410 may communicate with the server 200 that provides the integrated wishlist service.

The second communication unit 420 communicates with the external user terminal apparatus 300.

More specifically, the second communication unit 420 may receive a signal for displaying a wishlist icon on the display screen according to the execution state of the integrated wishlist application in the user terminal apparatus 300.

In addition, when a particular object is selected through a wishlist icon displayed on the display unit 430, the second communication unit 420 may transmit the corresponding selected information to the user terminal apparatus 300. In this case, in the user terminal apparatus 300, information on the received object may be managed through the server 200 in the same manner as described above.

The display unit 430 may provide various display screens according to the execution state of the integrated wishlist application in the user terminal apparatus 300.

Especially, the display unit 430 may display the wishlist icon on the displayed shopping mall page.

In addition, the display unit 430 may display various information and a UI screen provided through the integrated wishlist service according to the execution state of the corresponding integrated wishlist application.

Herein, the display unit 430 may be embodied as one of a liquid crystal display, thin film transistor-liquid crystal display, organic light-emitting diode, flexible display, and 3D display.

The storage unit 440 may store various information related to the integrated wishlist service.

For example, the storage unit 440 may store the wishlist icon format, and various UI layout information provided in relation to the integrated wishlist service.

In some cases, the storage unit 440 may store category information and related shopping mall information on the objects frequently recorded in the integrated wishlist, and brief information on the objects recorded in the integrated wishlist. Accordingly, brief information may be made available to the user.

In addition, the storage unit 440 may store information on the user terminal apparatus 300. Accordingly, the display apparatus 400 is able to communicate with the user terminal apparatus 300.

The user interface unit 450 may be an input means for receiving a user command and delivering the user command to the control unit 470, such as an input panel. Herein, the input panel may be a keypad or a mouse having various functional keys, number keys, and letter keys.

More specifically, the user interface unit 450 may receive various commands for controlling an integrated wishlist service. For example, the user interface unit 450 may receive a user command that selects an object through a wishlist icon and adds the object to the integrated wishlist.

In addition, the user interface unit 450 may receive a user command for displaying an integrated wishlist on the display unit 430.

The UI processor 460 may create various types of GUIs.

For example, the UI processor 460 may process the wishlist icon displayed on the screen in various formats, or process the integrated wishlist provided from the server 200 or the user terminal apparatus 300 into various types of layouts.

The control unit 470 controls the overall operations of the display apparatus 400. Functions of the control unit 470 will be explained below. In addition, for convenience of explanation, the service provision server is a shopping mall server.

The control unit 470 may initiate an integrated wishlist service according to the execution state of the application in the user terminal apparatus 300.

When the integrated wishlist service is initiated, a menu regarding the integrated wishlist may be displayed on the display unit 430. Herein, the menu regarding the integrated wishlist may be various menus related to the wishlist icon and integrated wishlist service.

When there is a user manipulation regarding the wishlist icon displayed on the product image or product information, the control unit 470 may add the corresponding product to the integrated wishlist.

For example, when the cursor displayed on the screen passes above the object displayed on a web page, the control unit 470 changes at least one of the shape or color of the wishlist icon, and when there is a selection operation, the control unit 470 may add the corresponding product to the integrated wishlist.

Meanwhile, the control unit 470 may instruct the information on the product provided in the corresponding shopping mall server to be received and managed through the server 200. For example, the control unit 470 may transmit only brief information on the corresponding product to the user terminal apparatus 300, and the user terminal apparatus 300 may request the server 200 to obtain detailed product information, and the server 200 may request the shopping mall server for the detailed information and receive the detailed information from the shopping mall server.

However, in some cases, the control unit 470 may receive only information selected by the user and manage the received information. For example, in a case where the user selected only the image and price of the product on the web page, the display apparatus 400 may receive only the corresponding product information and manage the product information.

The control unit 470 may change the format of the wishlist icon and display the wishlist icon.

The control unit 470 may indicate that an update to product information has been performed by ordering objects having updated information to be displayed at the front of the integrated wishlist, highlighting the objects having the updated information in the integrated wishlist, or other methods.

Figure 9:
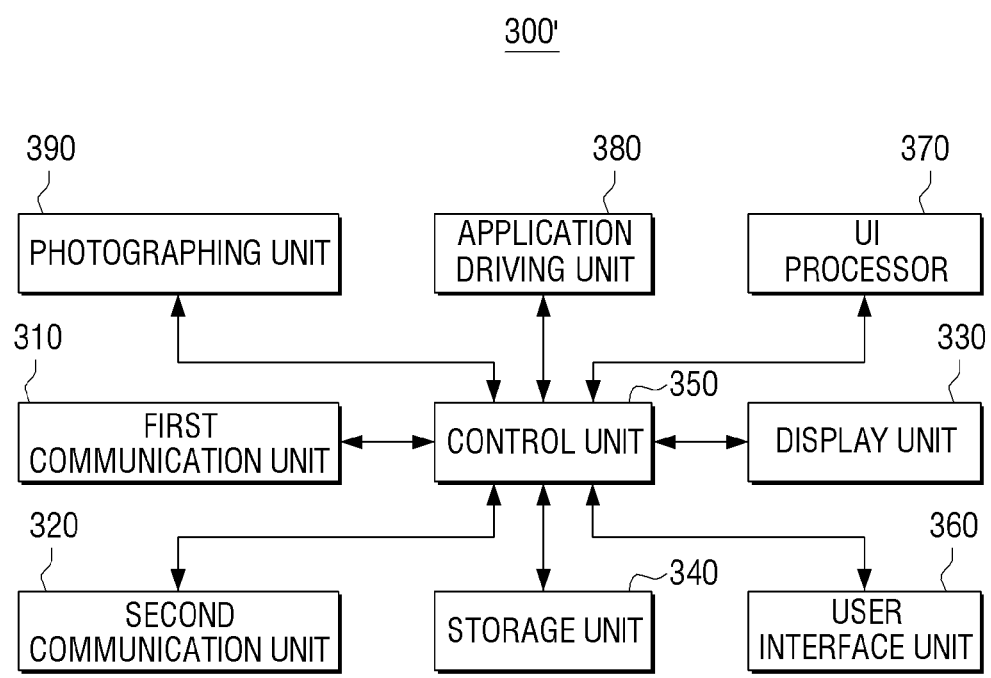
FIG. 9 is a block diagram illustrating a detailed configuration of a user terminal apparatus.

FIG. 9 is a block diagram illustrating a detailed configuration of the user terminal apparatus illustrated in FIG. 8.

According to FIG. 9, the user terminal apparatus 300' may include a user interface unit 360, UI processor 370, application driving unit 380, and photographing unit 390 in addition to the elements illustrated in FIG. 8.

Functions of the user interface unit 360, UI processor 370, application driving unit 380, and photographing unit 390 are similar to functions in the user interface unit 150, UI processor 160, application driving unit 170 and photographing unit 180, and thus detailed explanation is omitted.

Figure 10:
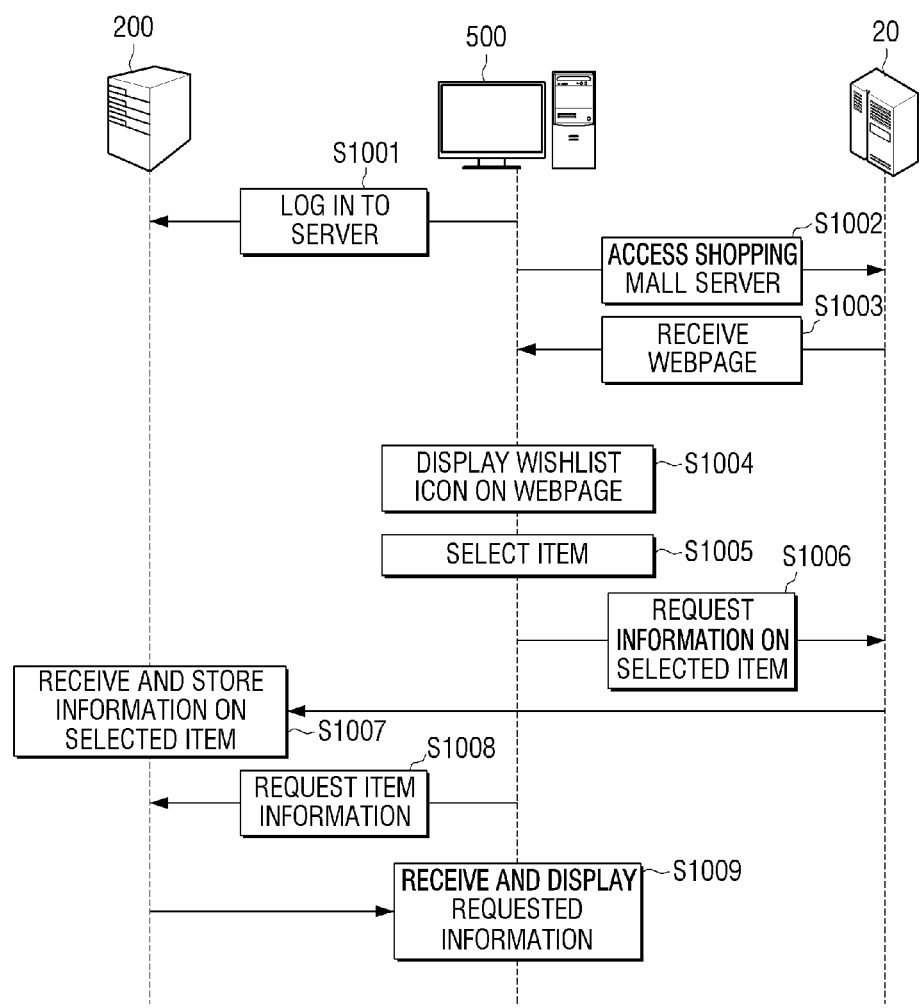
FIG. 10 is a view for explaining an operation of a network system.

FIG. 10 is a view for explaining operations of a network system illustrated in FIG. 3. Of the steps illustrated in FIG. 10, detailed explanation of those steps illustrated in FIGS. 4 and 7 will be omitted.

According to FIG. 10, the display apparatus 500 logs in to the server (S1001).

Next, the display apparatus 500 accesses the shopping mall server 20 (S1002), and receives a web page (S1003).

Next, the display apparatus 500 displays an object that indicates the integrated wishlist function is active on the received web page, for example a wishlist icon (S1004).

When an item is selected on the web page (S1005), the display apparatus 500 requests the server 20 for information on the selected item (S1006).

The server 20 transmits the information on the selected item to the server 200, which stores the received information according to control by the display apparatus 500 (S1007).

Next, the display apparatus 500 requests the server 200 for item information registered in the integrated wishlist according to a user command (S1008), receives the requested information, and displays the received information (S1009).

Detailed explanation on the operations performed in other steps will be made with reference to the block diagram hereinbelow.

Figure 11:
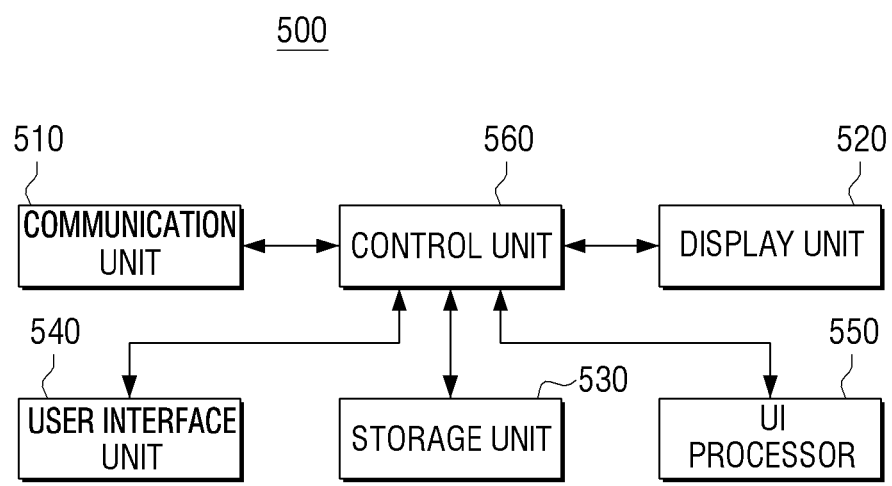
FIG. 11 is a block diagram illustrating a configuration of a display apparatus.

FIG. 11 is a block diagram illustrating a configuration of the display apparatus 500 illustrated in FIG. 10.

According to FIG. 11, the display apparatus 500 includes a communication unit 510, display unit 520, storage unit 530, user interface unit 540, UI processor 550 and control unit 560. Of the elements illustrated in FIG. 11, those already explained with reference to FIG. 9 will be omitted.

The communication unit 510 may communicate with various service provision servers through the network. Herein, the service provision server may be a server which operates various types of online shopping malls.

In addition, the communication unit 510 communicates with the server 200 through the network. Herein, the server 200 may be embodied as an SNS server, cloud server, etc., which may manage the integrated wishlist, but is not limited thereto.

Meanwhile, the communication unit 510 transmits and receives various information so that the integrated wishlist can be managed through the server 200.

For example, the communication unit 510 may use the user authentication information to log in to the server 200, and receive the integrated wishlist service corresponding to the authenticated user.

The display unit 520 may display a GUI.

Especially, the display unit 520 may display a wishlist icon for providing the integrated wishlist service.

More specifically, when a shopping mall web page is displayed, the display unit 520 may display a menu regarding the integrated wishlist, for example a wishlist icon on the corresponding screen.

The storage unit 530 is a storage medium in which various programs necessary for operating the display apparatus 500 are stored, and may be embodied as a memory or HDD (Hard Disk Drive).

Especially, the storage unit 530 may store information related to the integrated wishlist service. That is, information related to the integrated wishlist service may be stored and managed through the server 200, but information frequently used through the corresponding service may be stored in the storage unit 530.

For example, UI layout information related to the corresponding integrated wishlist service and product information frequently recorded through the integrated wishlist may be managed through the storage unit 530.

The user interface unit 540 have the same functions as the user interface unit 450 and thus detailed explanation thereof is omitted.

The control unit 560 controls the overall operations of the display apparatus 500. Functions of the control unit 560 will be explained below. In addition, for convenience of explanation, the service provision server will be assumed as a shopping mall server.

The control unit 560 may initiate the integrated wishlist service using user authentication information to log in to the server 200. The user authentication information may be for example, a user ID and password.

User authentication information for logging into the server 200 and user authentication information for logging in to the shopping mall may be different, but in some cases, it may be possible to use one authentication information. The control unit 560 controls authentication to both the server 200 and the shopping mall server.

For example, in a case of logging in to a predetermined shopping mall server, or logging in to the server 200, integrated wishlist authentication information may be used.

When the user is successfully authenticated by the server 200 and an integrated wishlist service is initiated, the control unit 560 may display a wishlist icon on the shopping mall web page displayed on the display unit 520 according to a control of the server 200.

The control unit 560 may display a wishlist icon in various formats, as discussed above.

When a user is logged out from the server 200, the wishlist icon may be removed from the screen.

Otherwise, when the wishlist icon is not activated for a predetermined period of time, and when the corresponding web page is in a minimized state for a predetermined period of time, the control unit 560 may make terminate the integrated wishlist application and services and remove the wishlist icon.

The control unit 560 may reconfigure the UI screen provided in the integrated wishlist service.

More specifically, when there is an integrated wishlist view command, the control unit 560 may display the objects stored in the integrated wishlist, as discussed above.

When logged out of the server 200, the control unit 560 may terminate the integrated wishlist service.

In addition, when the wishlist icon is inactive for a predetermined period of time, the control unit 560 may automatically log out of the server 200.

Figure 12:
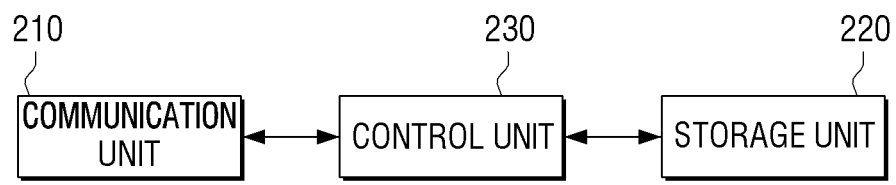
FIG. 12 is a block diagram illustrating a configuration of a server according to an exemplary embodiment.

FIG. 12 is a block diagram illustrating a configuration of a server according to an exemplary embodiment.

According to FIG. 12, the server 200 includes a communication unit 210, storage unit 220 and control unit 230.

The server 200 may be embodied in various formats, and for convenience of explanation, the server 200 will be explained on the assumption of the first exemplary embodiment illustrated in FIG. 1. However, in cases of the second exemplary embodiment and third exemplary embodiment illustrated in FIGS. 2 and 3, the server 200 may be embodied in the same format.

The server 200 may manage the integrated wishlist information, provide the integrated wishlist information management, and provide settlement relay service.

When there is a purchase request to purchase the object managed through the integrated wishlist, the server 200 may connect to a purchase page of the shopping mall server corresponding to the corresponding object and settlement may be completed through a purchase page of the shopping mall server.

Otherwise, in a case where there is a purchase request to purchase an object managed through the integrated wishlist, the server 200 may provide the settlement relay service so that a settlement may be made in the corresponding shopping mall server through an integrated settlement page of the server 200.

For example, in a case where there is a purchase request to purchase the object managed through the integrated wishlist, the server 200 may transmit the settlement information to the corresponding service provision server.

More specifically, the server 200 transmits a user's settlement information input through the user terminal apparatus 100, 300 or display apparatus 400, 500 to the corresponding shopping mall server. Herein, the user's settlement information may be for example, credit card information and account information.

The server 200 may also independently perform settlement. Accordingly, in a case where there is a purchase request to purchase the object managed through the integrated wishlist, the server 200 may write a transaction for the corresponding object and perform settlement for the corresponding transaction.

More specifically, the server 200 may perform settlement using a credit card, real time account transfer, CMS account transfer, various cyber money, and mobile phone SMS settlement. Accordingly, the server may be embodied as a PSP (Payment Service Provider) to include various settlement functions, such as a card company server, bank server, communication operator server, and Paypal operator server.

A case where the server 200 performs a credit card settlement will be explained briefly below.

The server 200 may transmit information on a transaction through a payment gate company (hereinafter referred to as a P/G company) that provides an electronic commerce payment solution. When the P/G company notifies the VAN (Value Added Network) that a transaction has been made, the VAN company may request the credit card company for approval of transaction. Next, the server 200 may pay the settlement amount to the seller, and may send a transaction specification from the credit card company to the user (i.e., purchaser) so that the user may reimburse the payment amount.

In this case, the server 200 may transmit the settlement result to the corresponding shopping mall server.

Functions of each configurative element will be briefly explained and the operations performed in the server will be explained in detail below.

The communication unit 210 may include a first communication unit and a second communication unit.

The first communication unit communicates with the user terminal apparatus 100, 300.

The second communication unit receives information on each selected object through a plurality of different service provision servers, as the application for providing the integrated wishlist function stored in the user terminal apparatus 100, 300 is executed.

The storage unit 220 stores the received object information.

The control unit 230 integrates the received object information and manages the integrated wishlist.

When user information, including user authentication information, is received from the user terminal apparatus 100 (or display apparatus 400, 500), the server 200 may store and manage the user information received in the storage unit 220 in which information of a plurality of users is stored. As such, the user may receive the integrated wishlist service from the server 200.

The user inputs user authentication information, for example ID information and password information to the user terminal apparatus 100, logs in to the server 200, and accesses the integrated wishlist service.

The server 200 may create an account regarding the corresponding user terminal apparatus 100, 300 with only an operation of downloading the integrated wishlist application in the user terminal apparatus 100, 300. For example, the server 200 may create an account with identification information (for example telephone number) of the user terminal apparatus 100, 300. In this case, logging in to the corresponding account may be made possible by only executing the application.

The user may automatically, simultaneously log in to a plurality of shopping mall servers by logging in to the server.

The server may manage the integrated wishlist corresponding to the user and user terminal apparatus.

More specifically, when a request to add a particular object to the integrated wishlist is received from the user terminal apparatus 100, 300 (or display apparatus 400, 500), the server 200 may request the shopping mall server for information on the corresponding product and store, receive, and manage the information in the integrated wishlist.

In this case, the server 200 may receive the information on the product provided by the corresponding shopping mall server, store, and manage the received information, but the server 200 may receive and manage only particular product information selected by the user. For example, in a case where the user selects an image and price of the product on the web page, the server 200 may receive and manage only the particular corresponding information.

In addition, in a case where the shopping mall server 200 provides offline store information regarding the corresponding object, the server 200 may store and manage the corresponding information as well.

Meanwhile, the server 200 may manage the objects recorded in the integrated wishlist in various formats.

For example, the server 200 may store and manage the objects recorded in the integrated wishlist according to the order the objects are recorded. In this case, the server 200 may manage the objects contained in the integrated wishlist on a time line base.

Otherwise, the server 200 may classify the objects recorded in the integrated wishlist according to type, and store/manage the classified objects. The server 200 may communicate with other service provision servers that provide purchase information on an object contained in the integrated wishlist whenever a predetermined event occurs. The other service provision server may be at least one of a credit card related server, a price comparison related server, and a real time product evaluation provision related server.

More specifically, the server 200 may communicate with the other service provision server that provides purchase information on at least one object included in the wishlist and update the integrated wishlist. For example, the server 200 may update various purchase information on at least one object included in the integrated wishlist.

For example, the server 200 may communicate with the other provision server, apply the evaluation regarding at least one service provided in the other service provision server, set a grade for the other service provision server, and reflect the set grade in the integrated wishlist.

Accordingly, when a predetermined event occurs, the server 200 may update purchase information on the corresponding object based on the grade regarding the updated service provision server and provide the updated purchase information.

In addition, the server 200 may determine at least one of the corresponding advertisement message contents, advertisement provision period, and advertisement message provision method according to the set grade, and may provide purchase information on the corresponding object based thereon.

In addition, the server 200 may provide purchase information in a method corresponding to at least one of message transmission to the user terminal apparatus 100, email transmission to an email account, and mail transmission.

In addition, the server 200 may provide purchase information in a corresponding purchase information provision method according to a currently set grade, when a user visits at least one of an offline store and shopping site which sells the corresponding object.

In a case where there is a change of information on the product in the integrated wishlist, the server 200 may update the corresponding information or notify the user terminal apparatus 100, 300 of the corresponding update. In this case, the updated contents may be provided to the user in an SMS message format, or by using an IP protocol.

More specifically, when a predetermined event occurs, the server 200 may request the shopping mall server 20 for the most recent information on the corresponding product, and if the information received in reply to the request is different from the stored information, the server 200 may notify the user that updated information exists. Herein, the predetermined event may refer to a case where there is a purchase request (or settlement request) for a corresponding product, or a case where there is an information update request for the corresponding product.

For example, when there is a purchase request for a product contained in the integrated wishlist, the server 200 may request the shopping mall server for the latest product information, and if the information received according to the request is different from the stored information, the server 200 may notify the user. In this case, it is also possible that the server 200 requests the shopping mall server 20 to transmit the latest information on only the products having changed information without requesting the latest information on all products for which there has been a purchase request.

In addition, the server 200 may request the corresponding shopping mall server 20 for updated information when a predetermined event occurs (for example periodically) for the product contained in the integrated wishlist. The server 200 may also request the shopping mall server 20 to transmit updated information for only the products having updated information.

In addition, even if there is no request from the server 200, when there is updated information for a product contained in the integrated wishlist, the information may be provided to the server 200 in a push format.

The updated information may be for example, a price/discount change, an addition or expiration of a coupon, a sold out quantity notice, and offline store location and operating hours information.

Meanwhile, when storing and managing offline store information related to an object contained in the integrated wishlist, the server 200 may transmit the corresponding contents to the user terminal apparatus 100, 300 according to a predetermined event.

For example, in a case where a user carrying the user terminal apparatus 100, 300 enters an offline store related to the product contained in the integrated wishlist, the server 200 may transmit the corresponding contents to the user terminal apparatus 100, 300.

In this case, whether the user visited the offline store may be identified through a GPS provided in the user terminal apparatus 100, 300. More specifically, the user terminal apparatus 100, 300 may receive a GPS (Global Positioning System) signal transmitted from a GPS satellite (not illustrated) and create location information, and the created location information may be transmitted to the server 200. For example, the user terminal apparatus 100, 300 may measure the signal reaching time and distance from three or more GPS satellites and measure the current location of itself. In addition, a DGPS (Differential GPS) may be used to minimize the range of error. In addition, the user terminal apparatus 100, 300 may obtain not only the locations of latitude, longitude and altitude but also the exact time from the GPS signal.

When the server 200 is embodied as an SNS server, the server 200 may provide an information sharing function through SNS.

More specifically, the server 200 may compare the object list recorded in the integrated wishlist of a particular user with purchase lists of friends to determine whether any of the friends is a purchaser. When there is determined to be a purchaser as a result of the search, the server 200 may notify the user that a friend has purchased the product.

In addition, the server 200 may compare the object list recorded in the integrated wishlist of the user with other integrated wishlist, and provide information on the matches to the user. For example, in a case where a price in a shopping mall recorded in the integrated wishlist of a friend is cheaper for a same object recorded in a user's integrated wishlist, the server 200 may provide the corresponding information about the shopping mall and price to the user.

In addition, the server 200 may share information on objects recorded in the integrated wishlist of a particular user, or information on a purchased object with friends.

In addition, the server 200 may obtain opinions of friends in a voting method regarding a product recorded in the integrated wishlist of a particular user and enabling the user to monitor the result of the voting.

In addition, the server 200 may add product information of an offline store to the integrated wishlist based on LBS information and recommend the product information to friends.

Meanwhile, in a case where a notice message is provided to another user who purchased a product, the other user may input evaluation information on the corresponding product through his/her user terminal apparatus and provide the evaluation information to the server 200. Evaluation information may be recommendation or condemnation on purchasing the corresponding product, or information on the quality of the corresponding product.

Figure 13:
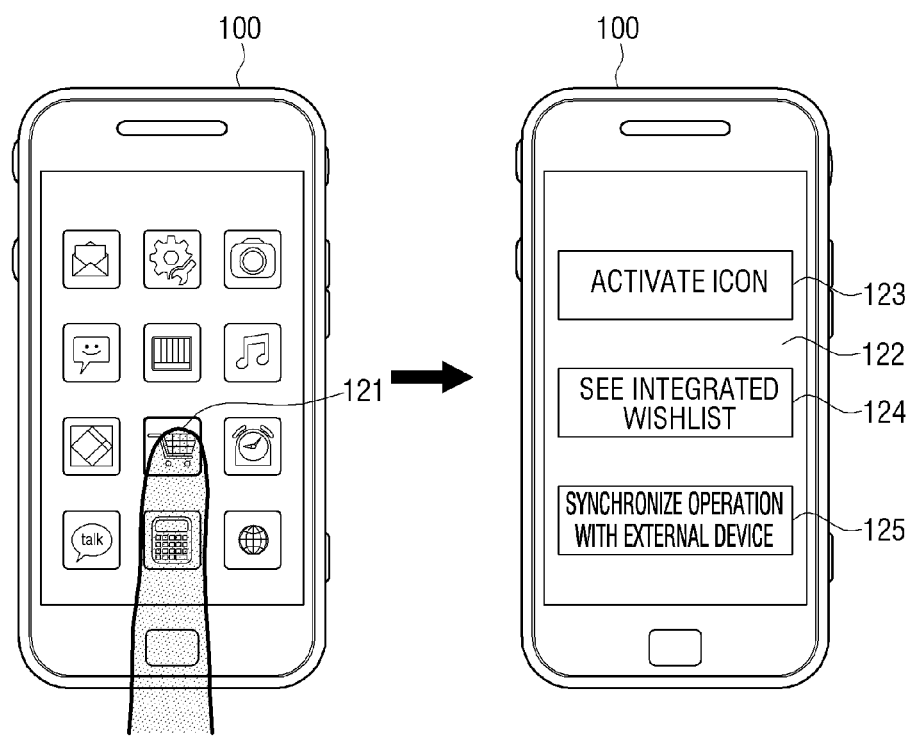
FIG. 13 is a view illustrating a UI screen of a user terminal apparatus according to an exemplary embodiment.

FIG. 13 is a view illustrating a UI screen of the user terminal apparatus according to an exemplary embodiment.

According to FIG. 13, in the user terminal apparatus 100, 300, the integrated wishlist application may be provided as a predetermined icon 121. Herein, the predetermined icon may be a basket image, but this is merely exemplary and is not limited thereto.

As illustrated, when an icon 121 corresponding to the integrated wishlist application is selected and the integrated wishlist application is executed, a menu 122 for an integrated wishlist service may be displayed.

For example, the menu 122 may include an "icon activation" menu 123, a "see integrated wishlist" menu 124 and a "synchronize with an external device" menu 125.

However, the menu 122 is merely exemplary.

Figure 14:
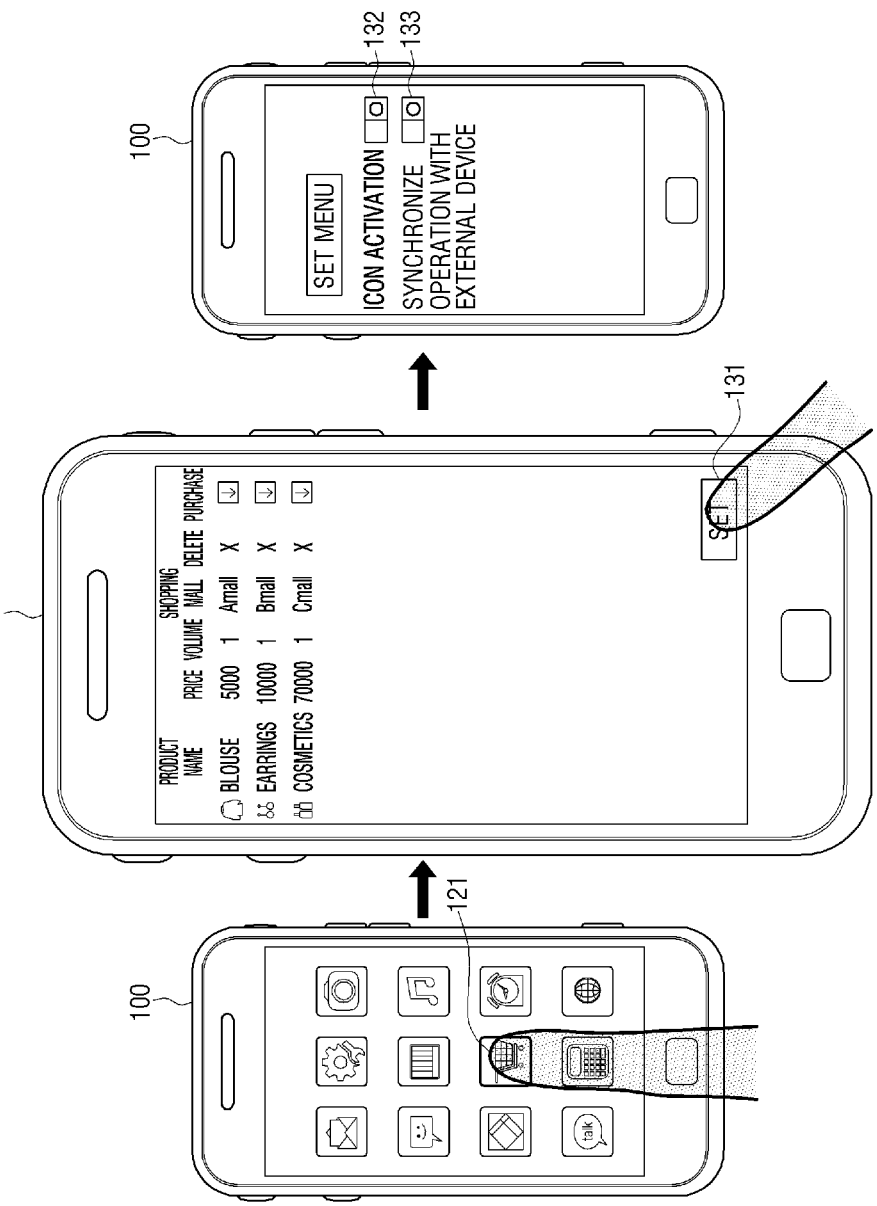
FIG. 14 is a view illustrating a UI screen of a user terminal apparatus according to an exemplary embodiment.

FIG. 14 is a view illustrating a UI screen of a user terminal apparatus according to an exemplary embodiment.

As illustrated in FIG. 14, when an icon 121 corresponding to the integrated wishlist application is selected, the object list recorded in the integrated wishlist may be displayed.

In this case, when an additional setting button 131 is displayed and the setting button is selected, a menu 132, 133 of selecting whether to enable the icon function or synchronization with an external device may be provided. As illustrated, in a case where the icon function and synchronization function are disabled, the icon and synchronization are not enabled when the application is active. On the other hand, in a case where the icon function and the synchronization function are enabled, the functions are enabled when the application is executed.

Figure 15:
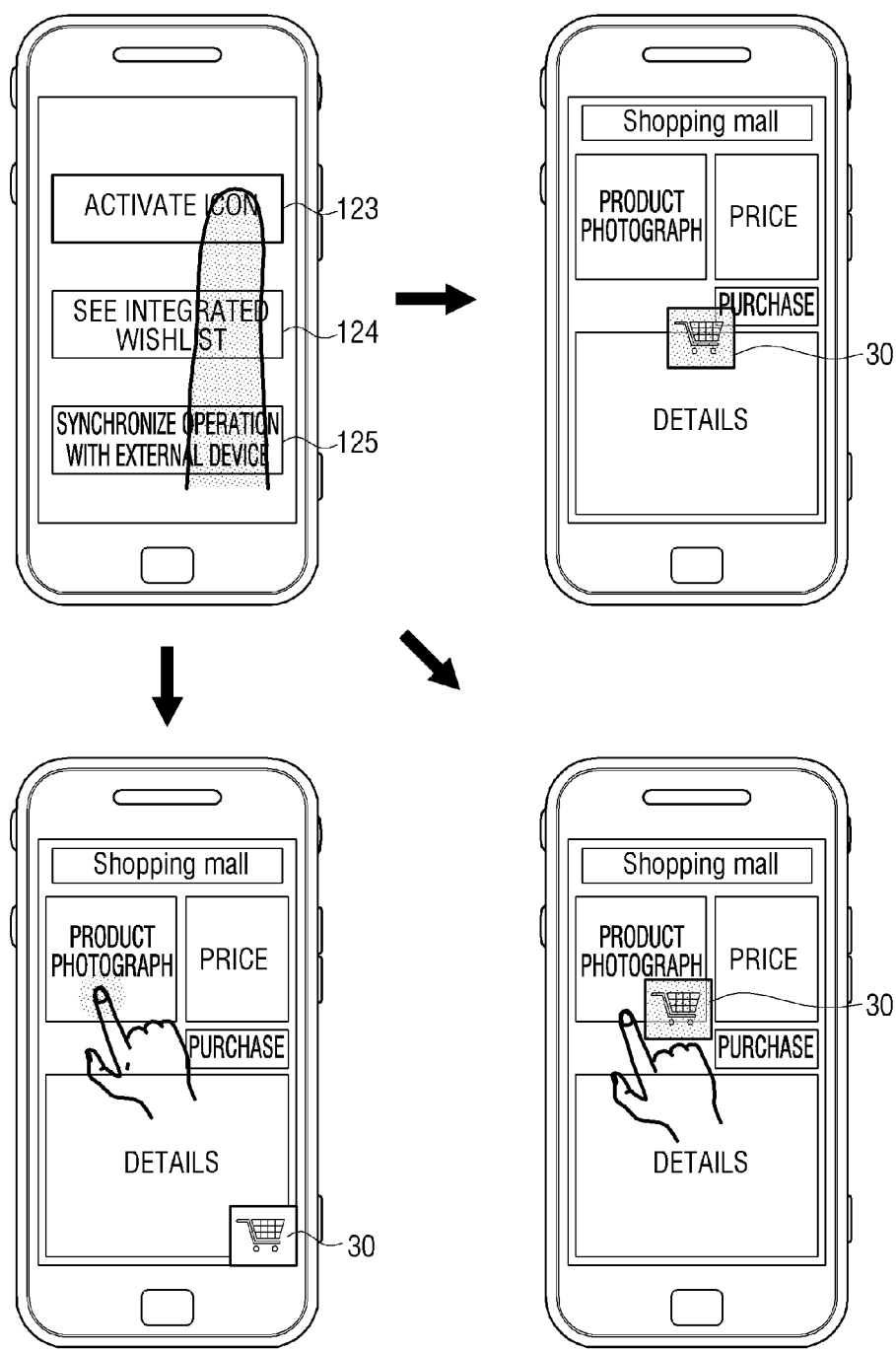

FIGS. 15 and 16 are views illustrating a UI screen in a case where one of the menus illustrated in FIG. 14 is selected.

The exemplary embodiment illustrated in FIG. 15 may be applied to the user terminal apparatus 100, 300.

As illustrated in an upper left of FIG. 15, when the "icon activation" menu 123 is selected, a wishlist icon may be displayed on the shopping mall web page.

For example, as illustrated in the lower left of FIG. 15, a wishlist icon 30 may be displayed on one side of the screen. The wishlist icon 30 is overlaid on top of the web page, such that the underlying web page is not viewable in the area of the wishlist icon 30. In this case, as illustrated, it is possible to touch a product image or product information and drag the product image or product information to the wishlist icon 30, or add the corresponding product to the integrated wishlist through a touch and flick manipulation. Alternatively, the wishlist icon 30 may be manipulated over the product image or product information to add the product to the integrated wishlist.

Otherwise, as illustrated in the upper right, the wishlist icon 30 may be displayed on another layer. The wishlist icon 30 is overlaid on top of the web page and is at least partially transparent, such that the underlying web page is viewable in the area of the wishlist icon 30. In this case, it is possible to add the object to the integrated wishlist through a touch and hold manipulation of the corresponding wishlist icon on the product image or product information. In this case, the user may touch and drag the wishlist icon 30 and move the display location. Again, in the alternative, the wishlist icon may be manipulated over the product image or product information to add the product to the integrated wishlist if the layer of the wishlist icon 30 is active.

Otherwise, as illustrated in the lower right, the wishlist icon 30 may be synchronized to the user touch point and may be displayed on one side of the touch point and follows the user input. In this case, it is possible to add the object to the integrated wishlist through a touch and hold manipulation on the product image or product information. During the touch and hold manipulation, at least one of the shape or color of the wishlist icon may be changed, and the corresponding product may be added to the integrated wishlist during a swipe operation in the changed state.

The exemplary embodiment illustrated in FIG. 16 may be applied to the display apparatus 400, 500.

As illustrated in the left of FIG. 16, when the "synchronize with an external device" menu 125 is selected, the wishlist icon may be activated and displayed on the shopping mall web page displayed on the display apparatus 400, 500 (view in the bottom).

For example, the wishlist icon 30 may be displayed on one side of the cursor 40. When the display location of the cursor 40 is moved, the wishlist icon 30 may track the display location of the cursor 40.

In this case, the object may be added to the integrated wishlist through a touch and hold manipulation on the product image or product information. At least one of the shape or color of the wishlist icon may be changed when passing above the object, and the corresponding product may be added to the integrated wishlist when a click or double click is made.

Meanwhile, in the user terminal apparatus 100, a screen that indicates that the integrated wishlist functionality is synchronized with the external device may be displayed.

FIGS. 17 to 20 are views illustrating a UI screen in a case where another menu of the menus illustrated in FIG. 14 is selected.

The exemplary embodiment illustrated in FIGS. 17 to 20 may be applied to the user terminal apparatus 100, 300.

Figure 17:
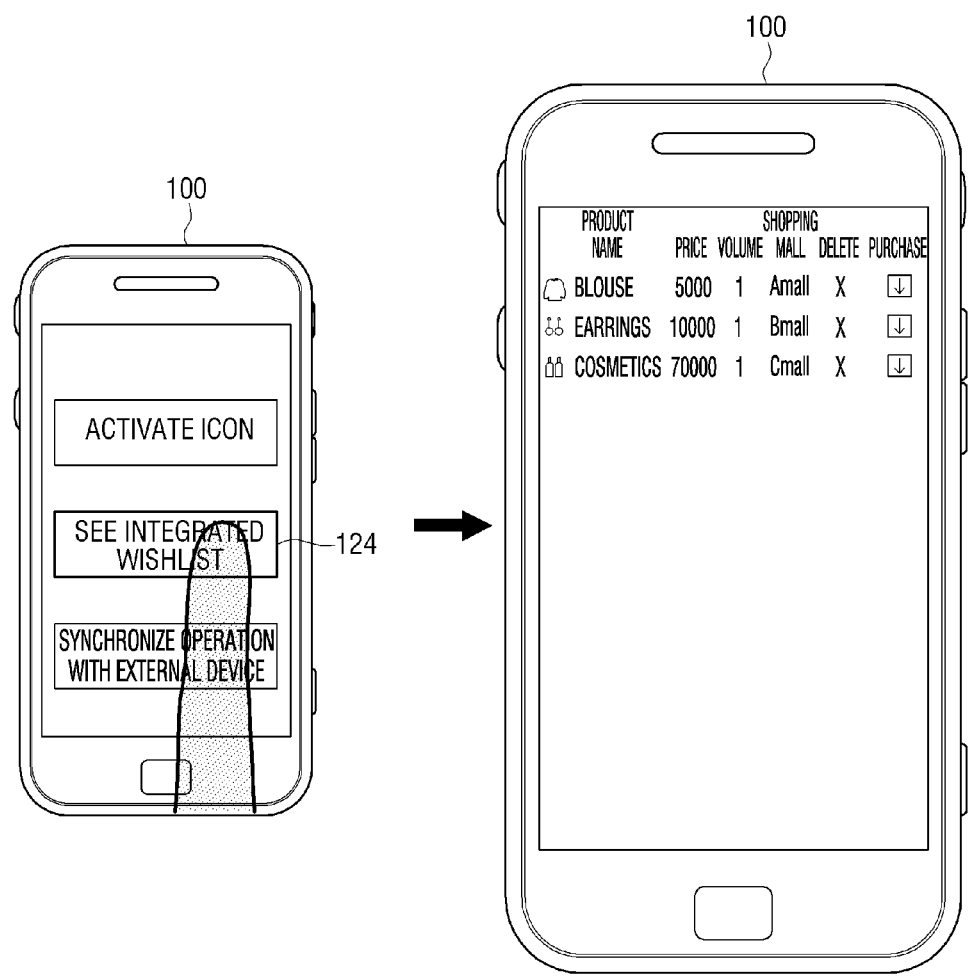
FIGS. 17 to 20 are views illustrating a UI screen.

As illustrated at the left side of FIG. 17, when the "see integrated wishlist" menu 124 is selected, an object list recorded in the integrated wishlist may be displayed, as illustrated at the right side of FIG. 17. The information corresponding to each object, for example, the price, quantity, and shopping mall information may be displayed, and a purchase button for purchasing the product and a delete button for removing an item from the integrated wishlist may be provided.

Figure 18:
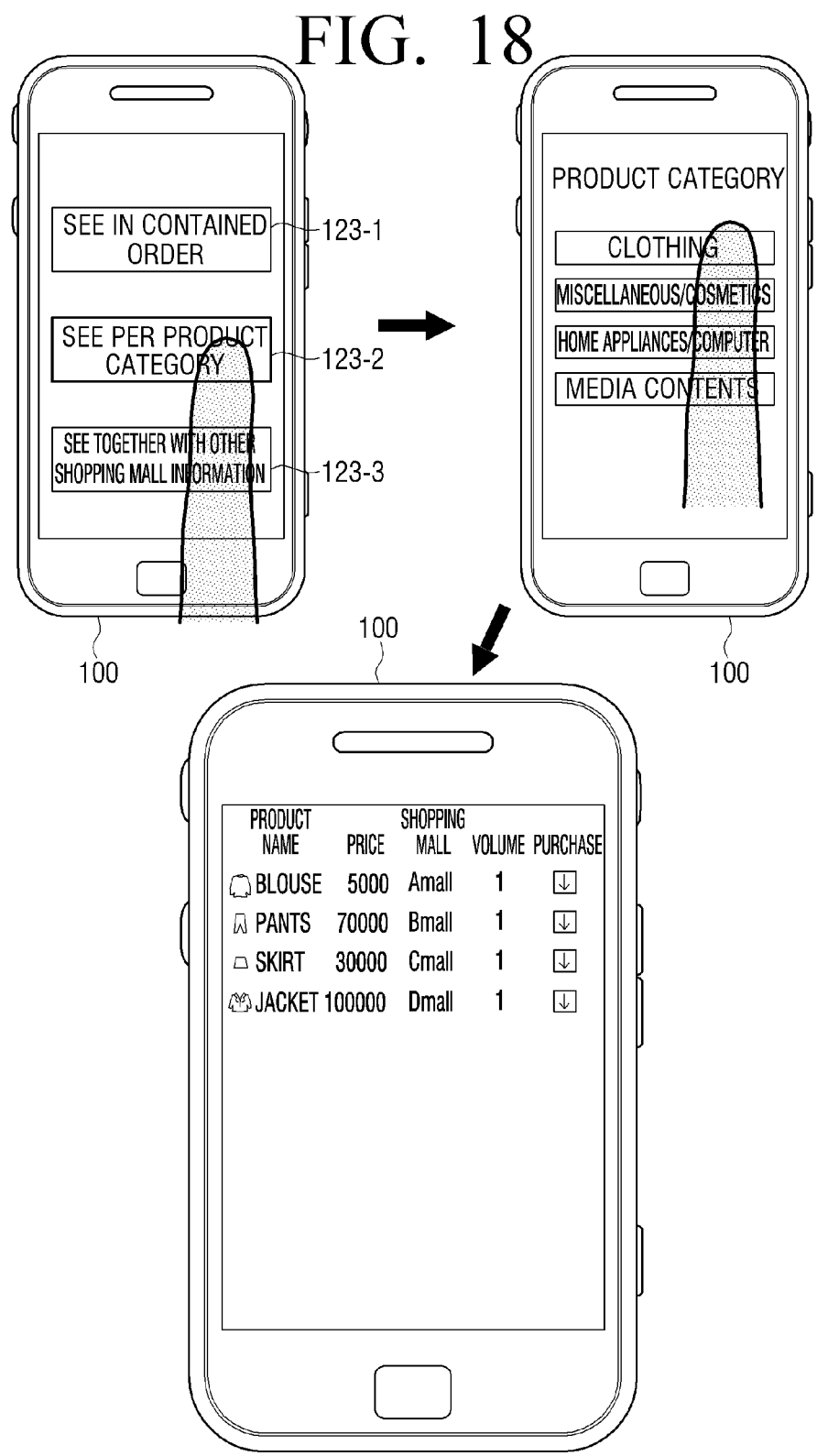

As illustrated in the upper left of FIG. 18, the "see integrated wishlist" menu may include sub menus, such as "see order that the objects are contained 123-1" sub-menu, "see per product category 123-2" sub-menu and "see with other shopping malls 123-3" sub-menu.

When "see per product category 123-2" menu is selected, a sub-menu that indicates categories of the objects contained in the integrated wishlist is displayed, as illustrated in the upper right side of FIG. 18.

When a clothes category is selected from the listed categories, as illustrated in the bottom of FIG. 18, only the objects in the integrated wishlist belonging to the clothes category may be displayed in a list format.

In addition, although not illustrated, it is also possible to provide a UI for categories such as "see in the order of price", and "see per shopping mall category".

Figure 19:
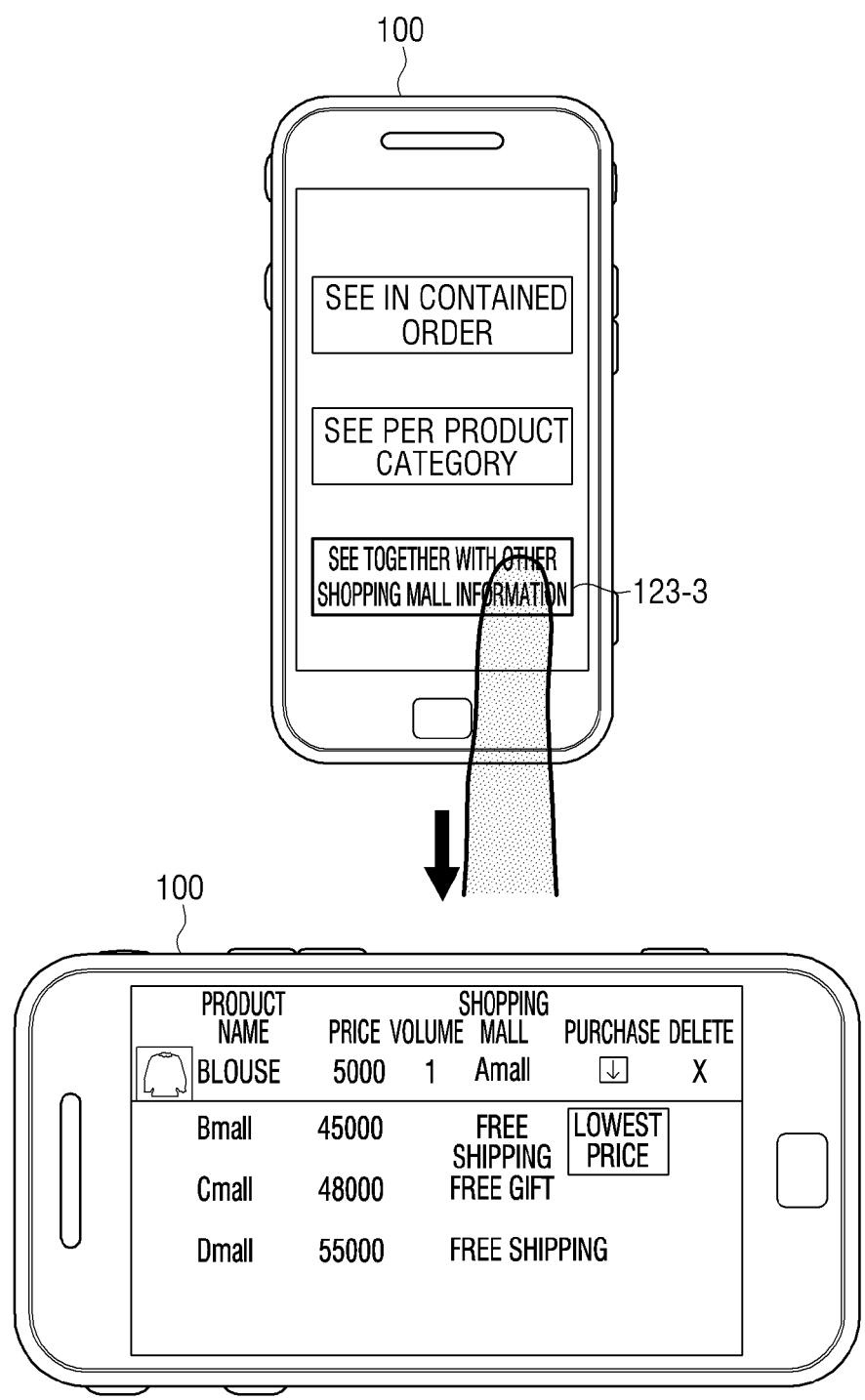

As illustrated in FIG. 19, when the "see with other shopping malls 123-3" sub-menu is selected, a UI screen listing shopping malls that sell the corresponding object may be provided for each object contained in the integrated wishlist. The shopping malls may be electronic commerce websites or physical shopping mall locations.

Accordingly, the user is able to compare pricing information for a product.

The aforementioned menus are merely exemplary, and may be implemented in various ways.

The sub-menus 123-1 . . . 123-3 may be prioritized, and therefore, it is possible to directly display the corresponding sub-menu UI screen without displaying the sub-menu list screen in the upper left of FIG. 18.

Figure 20:
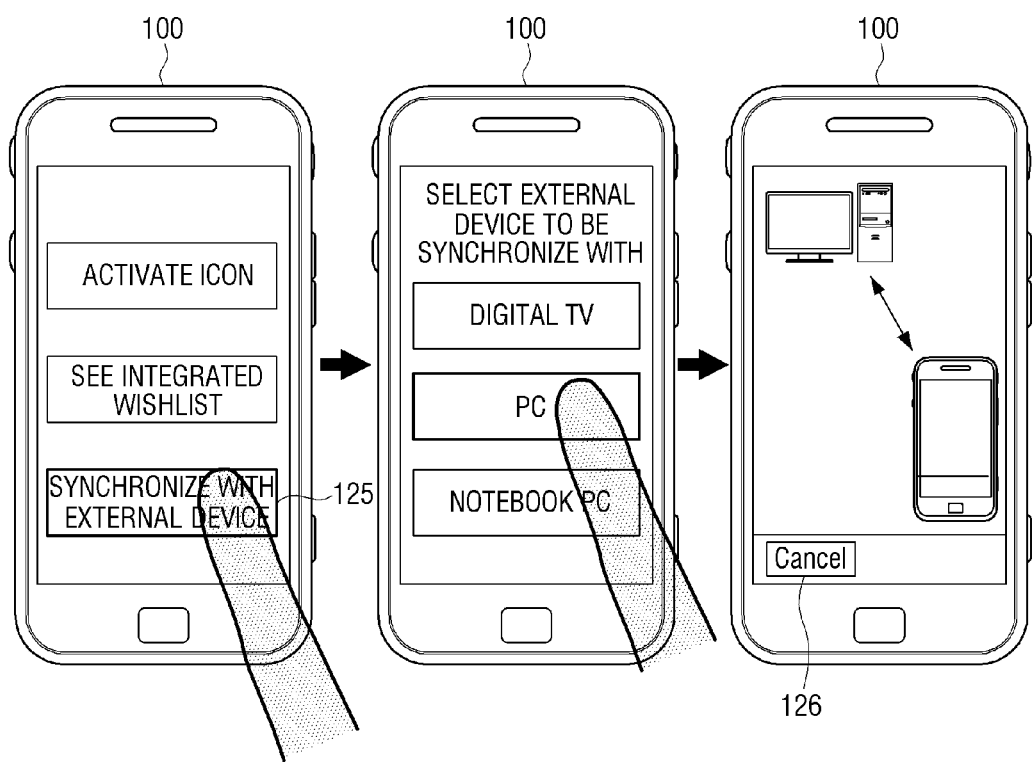

FIG. 20 is a view illustrating the UI screen in a case where another menu of the menus illustrated in FIG. 14 is selected.

As illustrated in FIG. 20, when the "synchronize with an external device" menu 125 is selected, the user terminal apparatus 300 may search for an external device, and a list of discovered external devices.

Next, when the "PC" is selected as the external device to be synchronized on the menu, a UI screen that illustrates a state, in which the user terminal apparatus 300 and external display apparatus 300 are synchronized to each other, is displayed. The synchronized state may be canceled through the "Cancel button" 126.

FIGS. 21 to 24 are views illustrating a UI format according to a change of mode of the user terminal apparatus.

As illustrated in FIGS. 21 to 24, in a case where the user terminal apparatus 100, 300 is changed from a length mode to a width mode, it is possible to display additional information.

Figure 21:
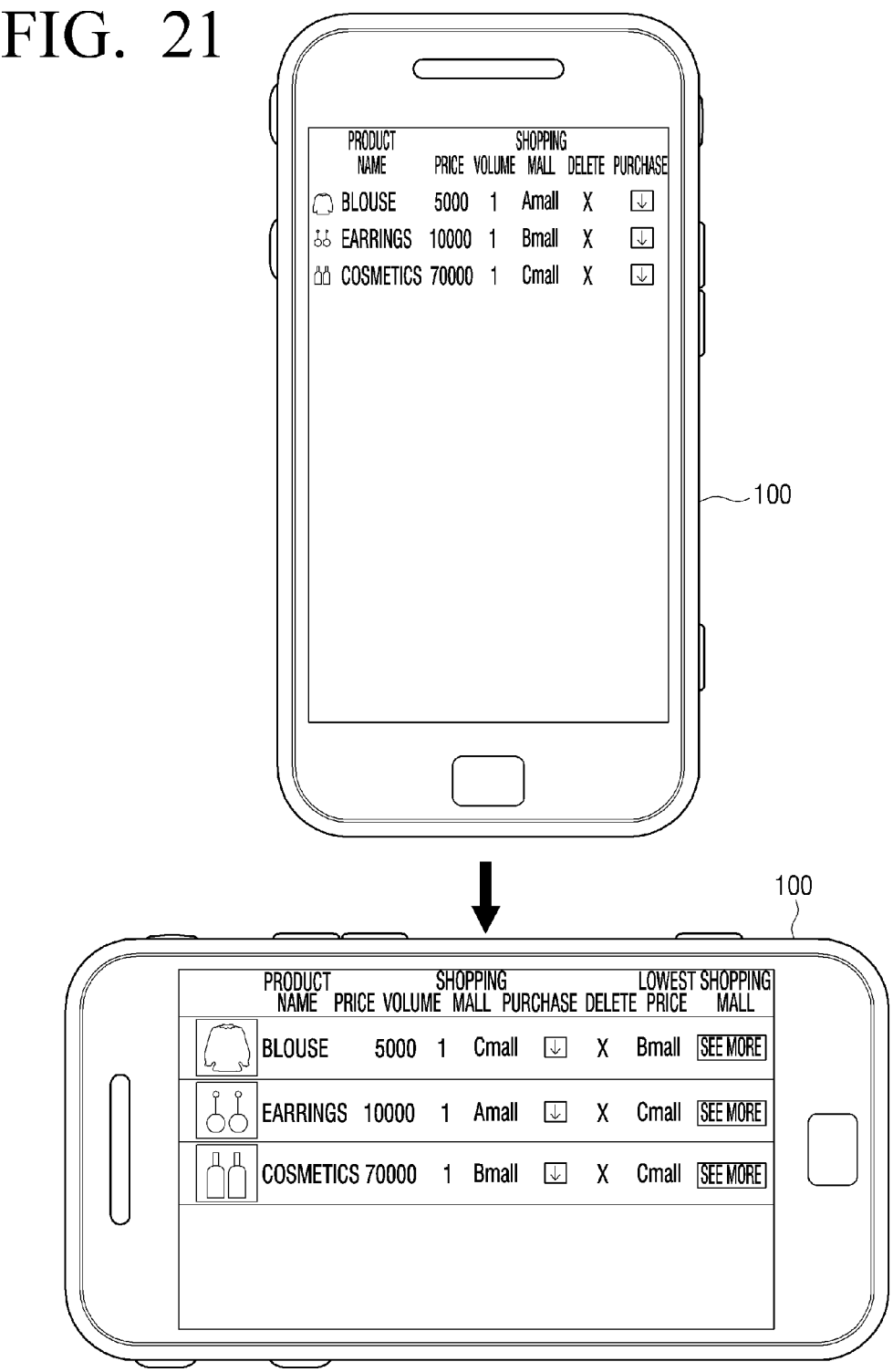
FIGS. 21 to 24 are views illustrating a UI format according to a change of mode of a user terminal apparatus.

For example, as illustrated in FIG. 21, in a case where an integrated wishlist item is displayed in a length mode, lowest price shopping mall information may be further displayed in each object list in the width mode. A "see more" button is also displayed to enable a display of detailed information on other shopping malls, other than a lowest price shopping mall, that offer the products in the integrated wishlist.

Figure 22:
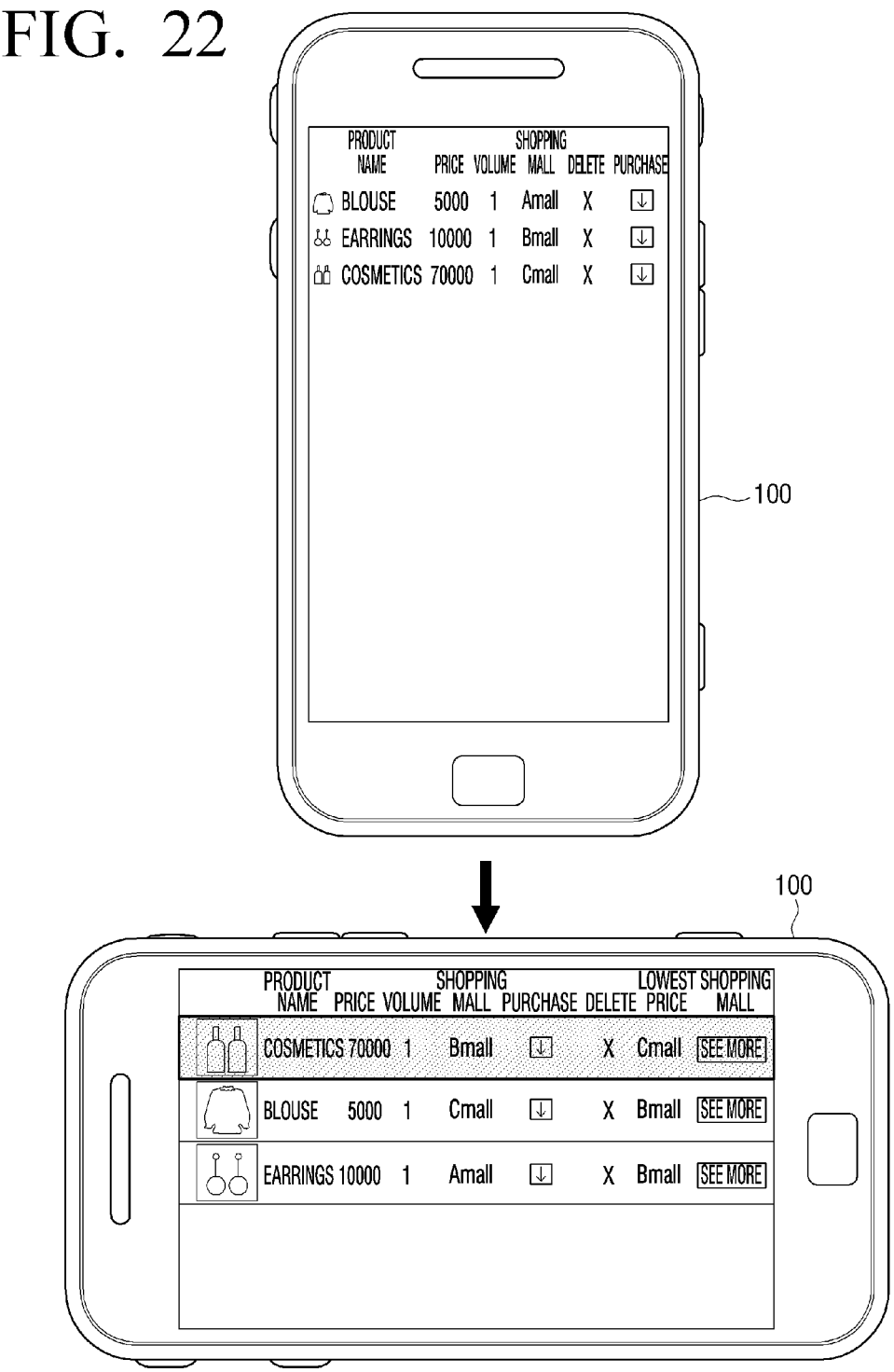

As illustrated in FIG. 22, in a case where the integrated wishlist item is displayed in the length mode, updated product information may be additionally displayed for each object in the width mode. In this case, as illustrated, the object having updated product information may be displayed at the top of the integrated wishlist, and may be highlighted to emphasize to the user that updated product information exists for the highlighted product.

Figure 23:
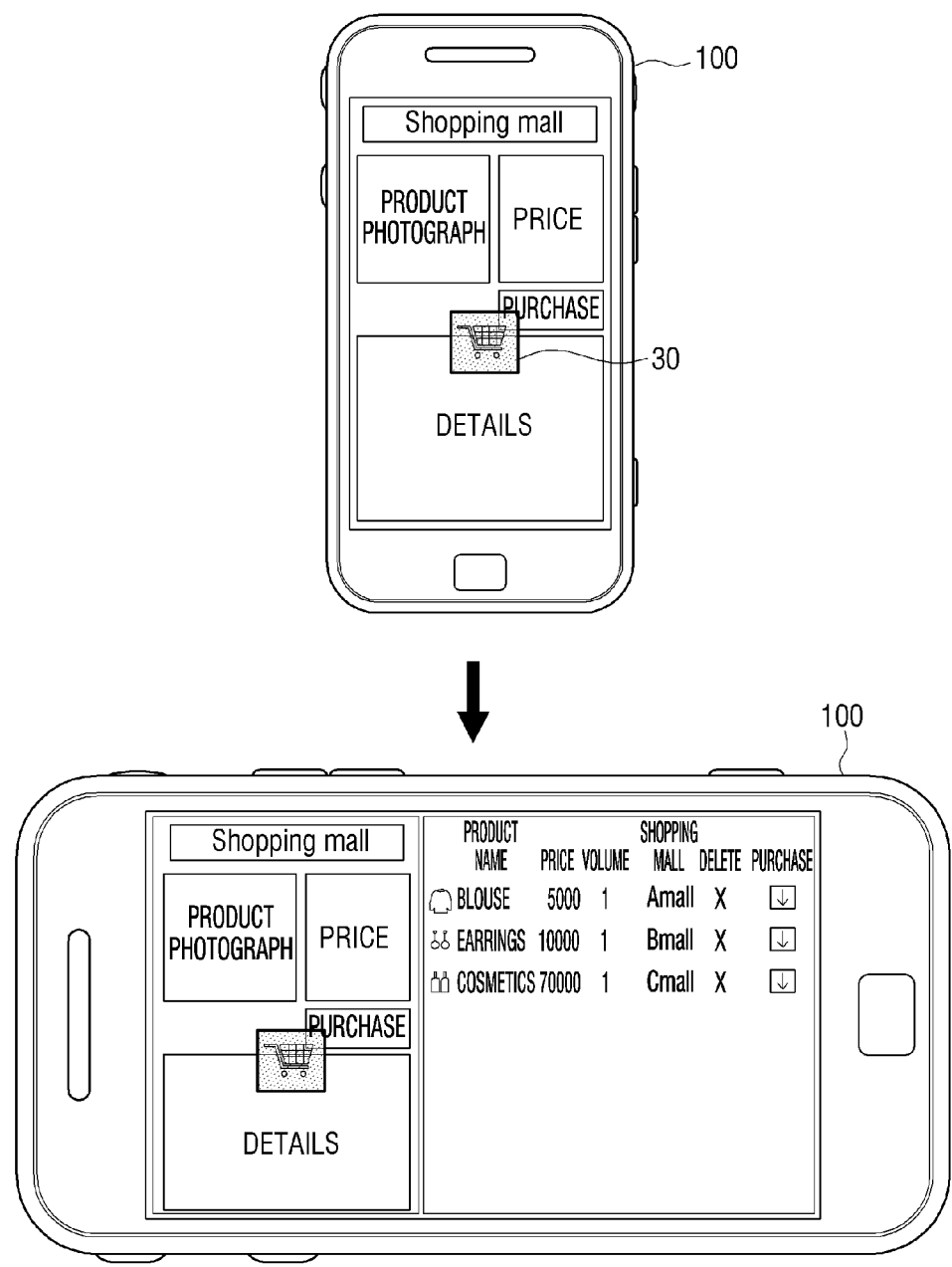

FIG. 23 illustrates a case where a shopping mall web page is displayed in the length mode, but it is possible to divide the screen and display the web page and integrated wishlist item together in the width mode. In this case, when a product is selected on the shopping mall web page, the integrated wishlist may be updated and displayed so that a user can simultaneously view the integrated wishlist and web pages.

In addition, in a case where the user selects a purchase button of a particular product from the integrated wishlist, the left screen in which the shopping mall web page screen is displayed may be converted into a purchase screen for completing the product purchase.

When converting from a width mode to a length mode, one of the divided screens may be displayed on the entire screen.

Figure 24:
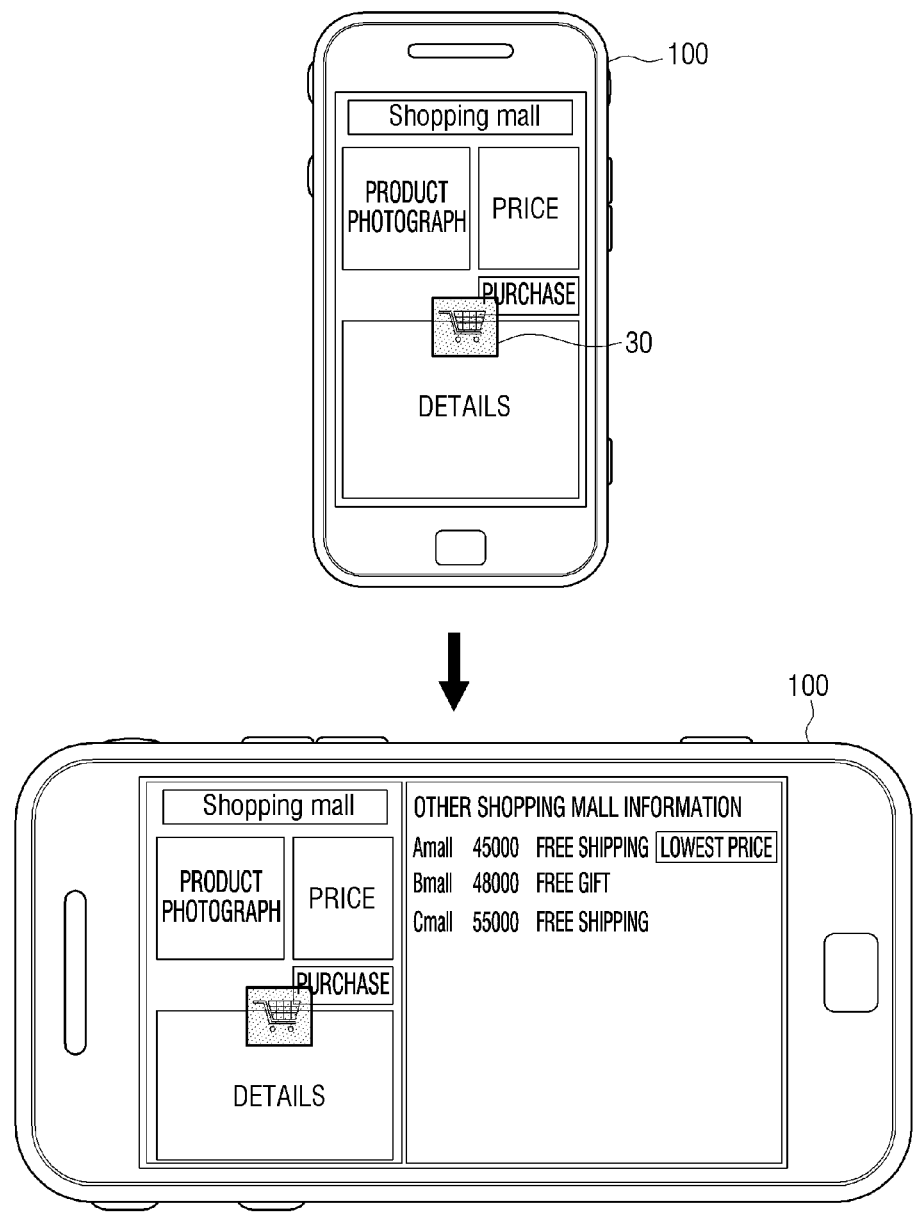

In addition, as illustrated in FIG. 24, in a case where the shopping mall web page is displayed in a length mode, it is possible to divide the screen and display the shopping mall web page on one side of the screen and other shopping mall information on the other side of the screen. The other information may be prices offered by other sources for purchasing the product.

Figure 25:
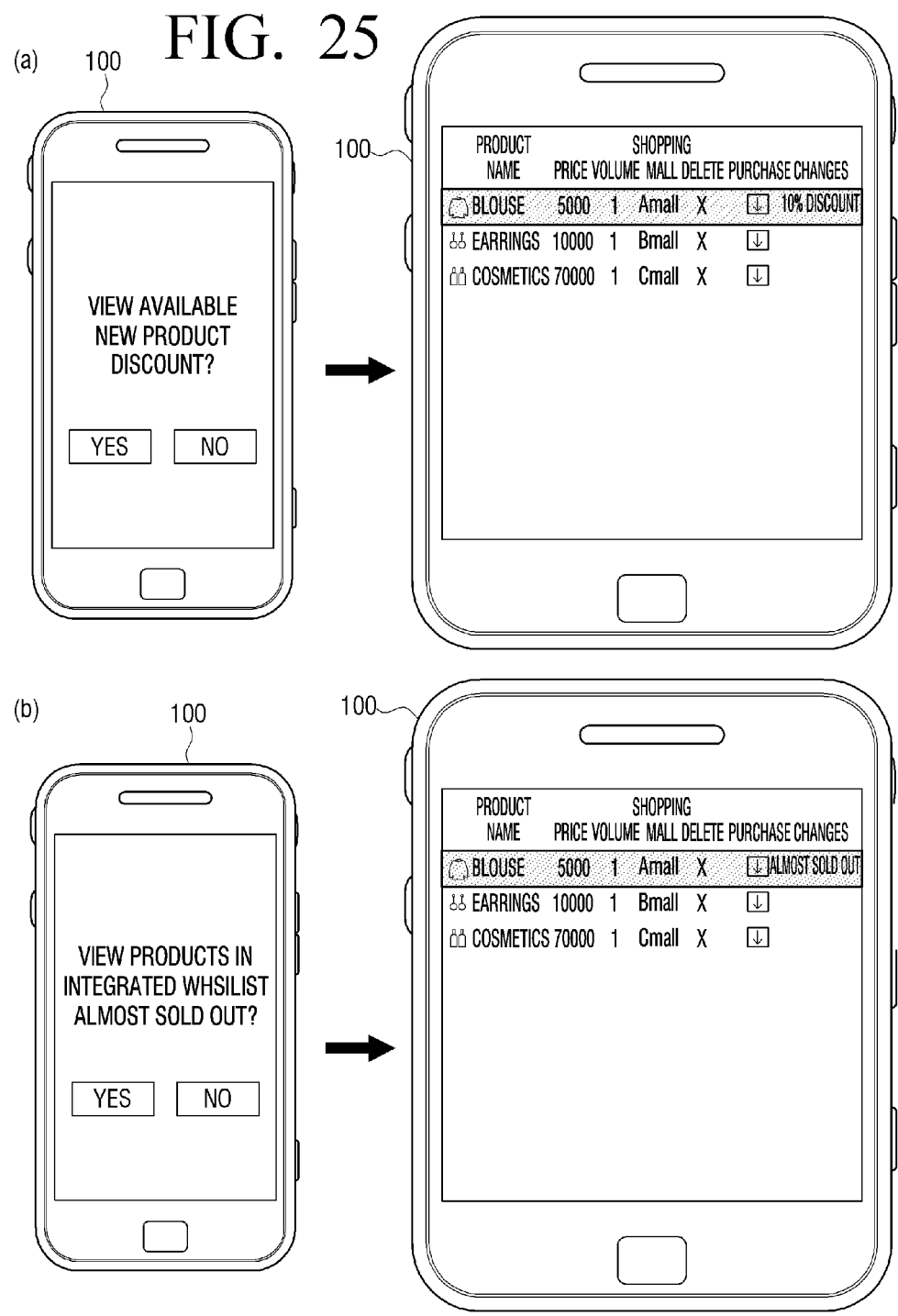
FIGS. 25 and 26 are views illustrating a UI screen according to exemplary embodiments.
Figure 26:
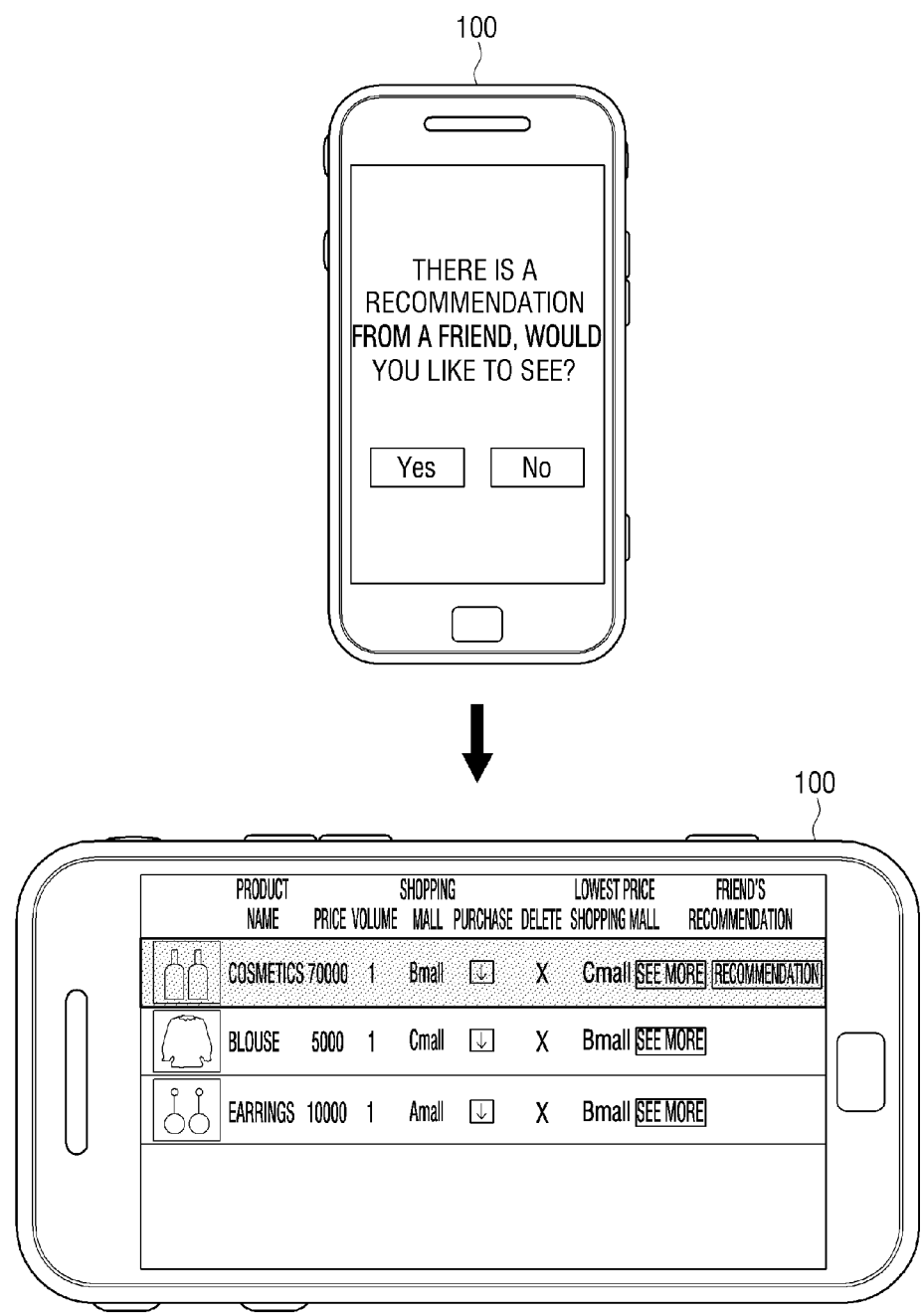

FIGS. 25 and 26 are views illustrating a UI screen according to exemplary embodiments.

As illustrated in FIG. 25(a), when product information contained in the integrated wishlist is changed, it is possible to display the UI screen which notifies the user that product information about a product in the integrated wishlist has changed. In this case, when the user selects the OK button, a list of products registered in the integrated wishlist may be displayed and information on the changed products may be highlighted and displayed. For example, the information on changed products may be highlighted and displayed at the top of the integrated wishlist.

As illustrated in FIG. 25(b), when a product contained in the integrated wishlist is almost sold out, it is possible to display a UI screen that notifies the user of the limited quantity of the product available. Likewise, information on the product may be highlighted and displayed at the top of the integrated wishlist.

As illustrated in FIG. 26, in a case where there is a recommendation by a friend through SNS regarding a product contained in the integrated wishlist, it is possible to display a UI screen that notifies the user of the recommendation. In this case, it is possible to distinguishably display the information on the product recommended by a friend, as discussed above.

Figure 27:
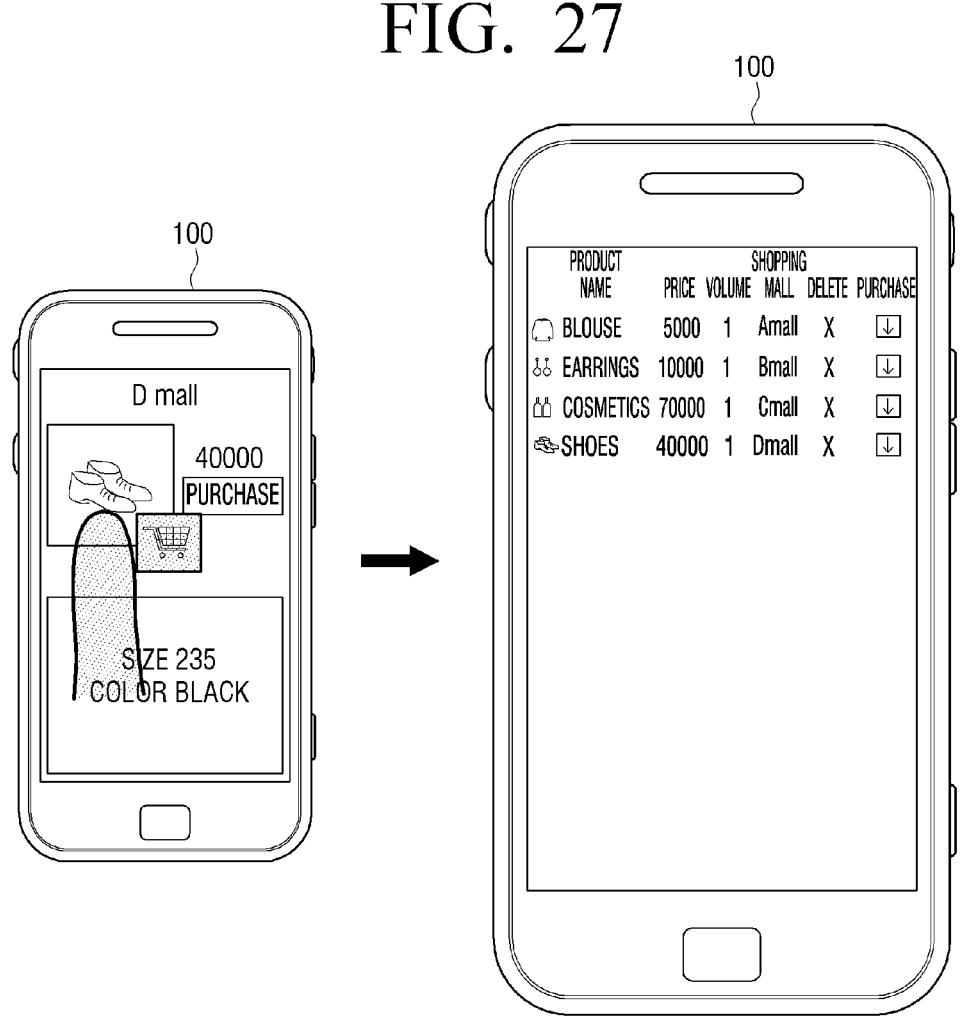
FIG. 27 is a view illustrating a UI screen according to an exemplary embodiment.

FIG. 27 is a view illustrating a UI screen according to an exemplary embodiment.

As illustrated in the left side of FIG. 27, when a product is selected on the shopping mall web page, the corresponding product may be added to the integrated wishlist. The integrated wishlist may be displayed when a new product is added to the integrated wishlist.

Figure 28:
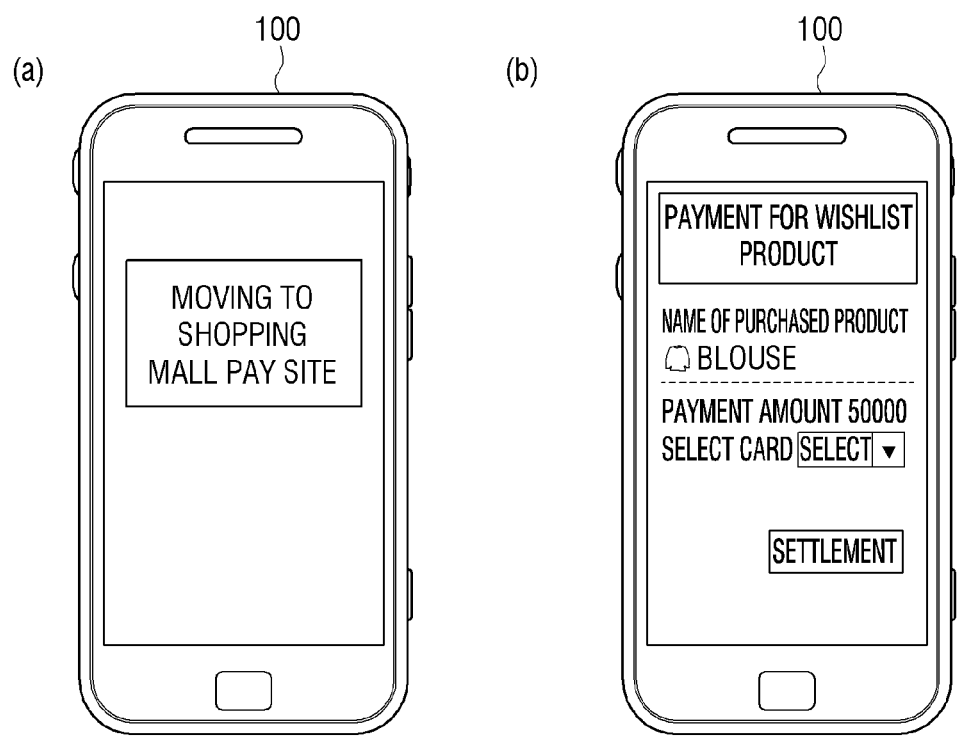
FIG. 28 are views illustrating a UI screen related to a settlement function.

FIG. 28 are views illustrating a UI screen related to the settlement function.

As illustrated in FIG. 28(a), in a case where the server 200 does not include a settlement service, and there is a purchase request for an object contained in the integrated wishlist, it is possible to provide a UI screen that informs the user the integrated wishlist application is redirecting the user to the corresponding shopping mall settlement site.

In addition, as illustrated in FIG. 28(b), in a case where the server 200 provides a settlement service, and there is a purchase request for an object contained in the integrated wishlist, a settlement UI screen for performing settlement for the corresponding object may be displayed.

Figure 29:
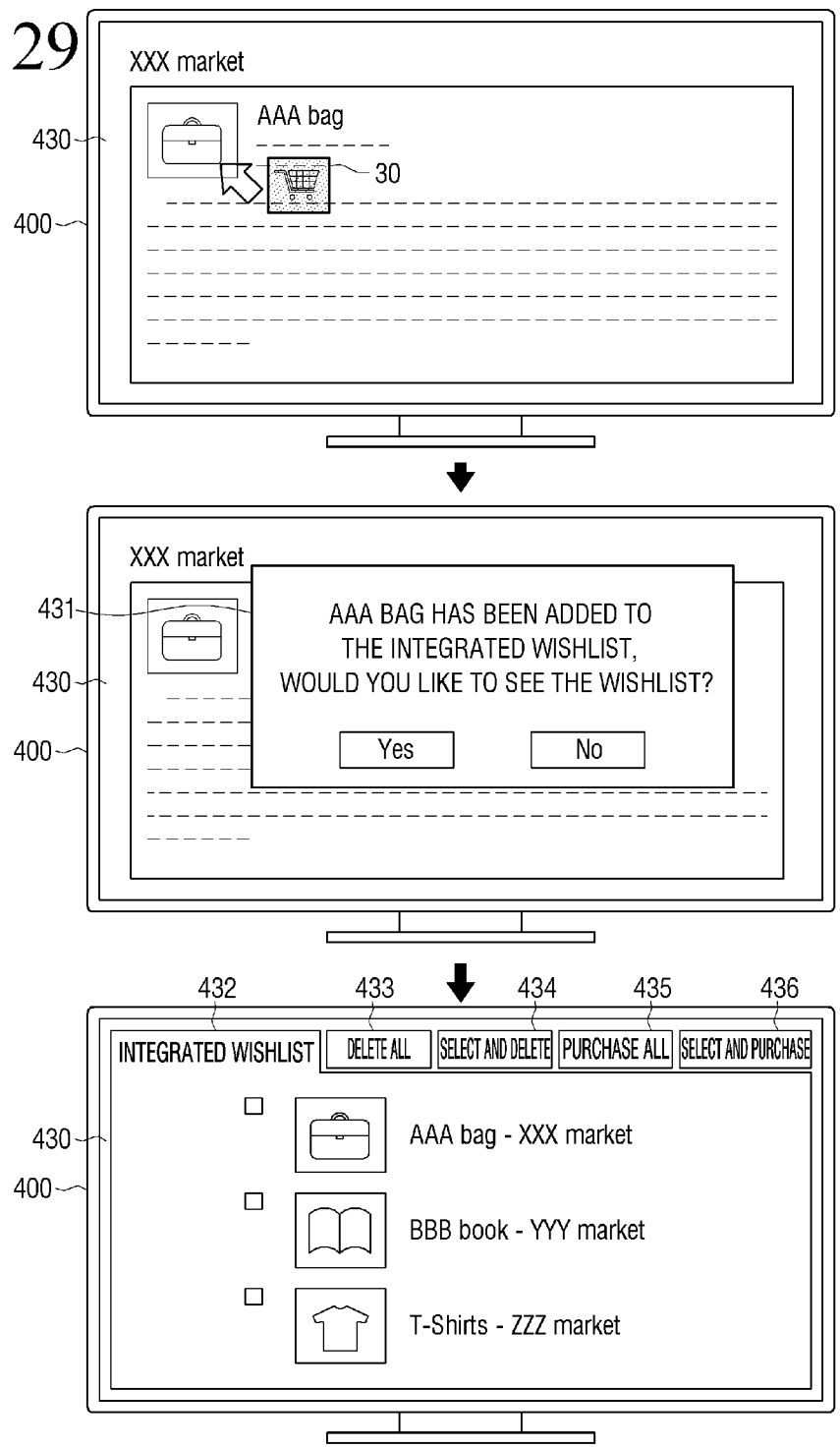
FIGS. 29 and 30 are views illustrating a display change of a screen in a display apparatus according to an exemplary embodiment.
Figure 30:
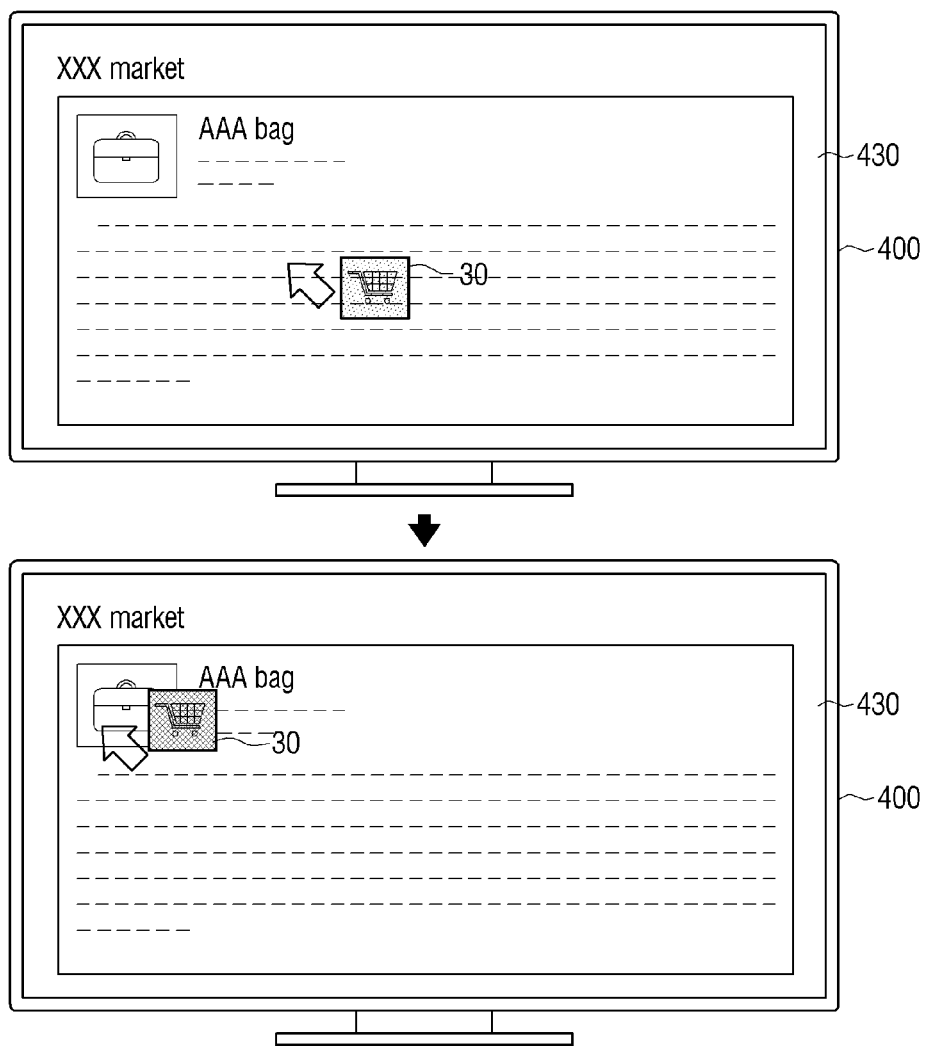

FIGS. 29 and 30 are views illustrating a display change in the display apparatus 400, 500 according to an exemplary embodiment.

The following explanation assumes the display apparatus 400, 500 is embodied as a PC for convenience of explanation.

As illustrated in the uppermost side of FIG. 29, the shopping mall web page may be displayed on the screen 430 of the display apparatus 400, and the wishlist icon 30 may be displayed on the web page.

As illustrated in the middle of FIG. 29, when a product is selected through the wishlist icon, a popup window 431 notifies the user that the corresponding product has been added to the wishlist.

When the user selects "Yes" in the screen illustrated in the middle of FIG. 29, an item list recorded in the integrated wishlist may be displayed on the screen, as illustrated in the lowermost side of FIG. 29. In addition, besides the item list 432 recorded in the integrated wishlist, additional menus, for example, delete all 433, select and delete 434, purchase all 435, and select and purchase 436 may be displayed as tabs of the integrated wishlist application on the screen 430 as well.

In FIG. 30, the wishlist icon 30 may be interlocked with the cursor.

More specifically, regarding the wishlist icon 30 illustrated in the upper side of FIG. 30, the color or shape of the icon 30 may be changed and displayed to be recognized by the user when the cursor passes above the selectable object, as illustrated by the darkened wishlist icon 30 in the lower side. In this state, when the user clicks the cursor, the corresponding product may be added to the wishlist.

Figure 31:
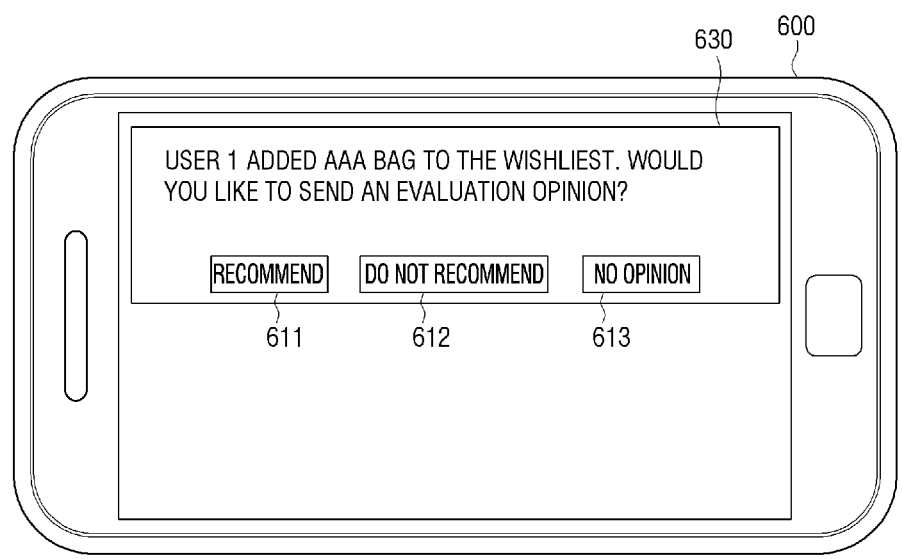
Figure 32:
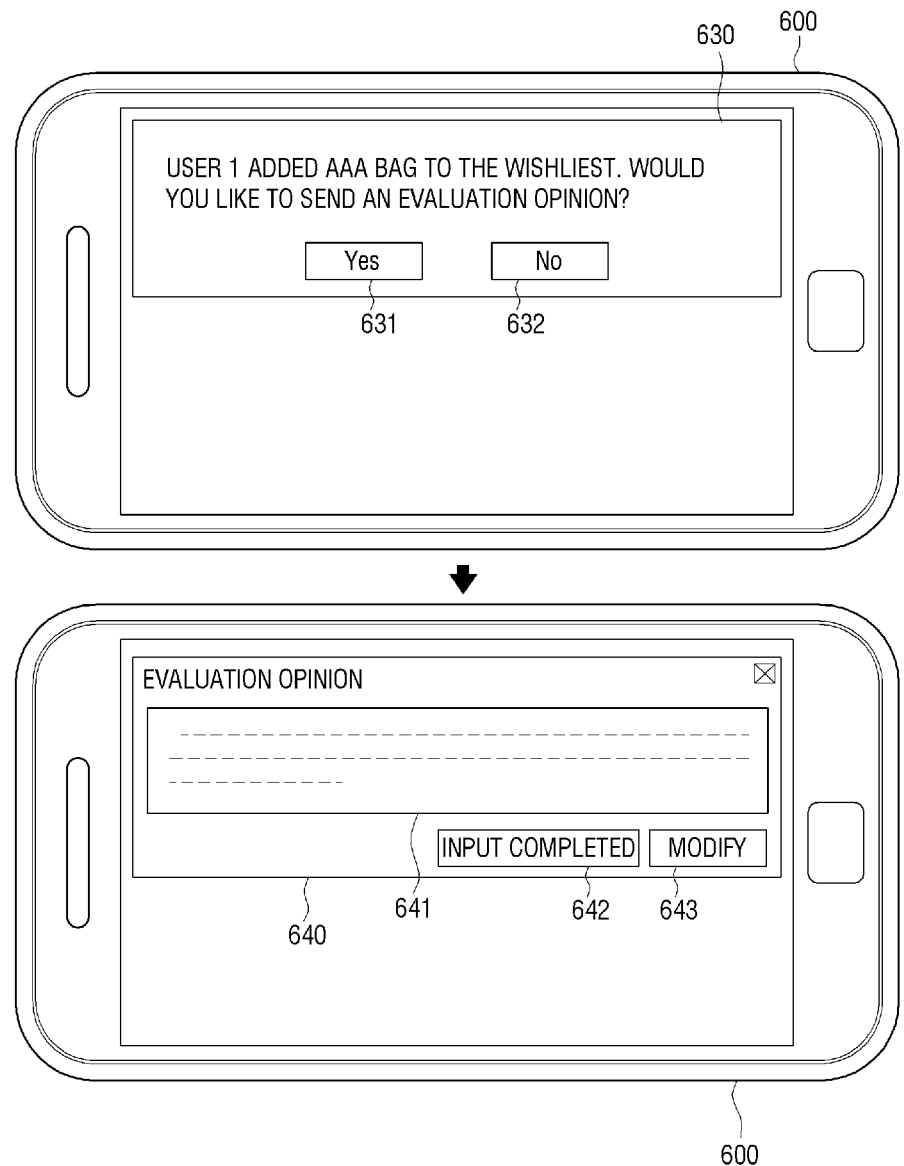

FIGS. 31 and 32 are views for explaining a format of a UI screen provided in the user terminal 600 of a second user who has a predetermined relationship with a first user of the user terminal apparatus 100, 300.

FIG. 31 illustrates a scenario when a particular product is added to the integrated wishlist through the user terminal 100, 300. On the screen of the user terminal apparatus 600 of the second user who has already purchased the corresponding product, together with a message that notifies the second user that the first user has added AAA bag to the integrated wishlist, a popup window 610 of various menus, such as recommend 611, do not recommend 612, and no opinion 613, is displayed. In this case, the second user may select one menu item. When the second user selects the recommend 611 or do not recommend 612 item, evaluation information corresponding thereto may be transmitted to the server 200 or user terminal 100, 300. Accordingly, the first user may receive the second user's recommendation based on the integrated wishlist.

As illustrated in the upper side of FIG. 32, a popup window 630 of Yes 631 and No 632 selections may be displayed on the screen of the user terminal apparatus 600 of the second user who has already purchased the corresponding product, together with a message indicating that the first user has added AAA bag to the integrated wishlist and a message requesting whether to transmit an opinion about the product.

When the second user selects Yes 631, a screen 640, which includes a window 641 where an evaluation opinion may be input an input completed 642 input, and correction 643 input, may be displayed. As such, the second user may provide the first user with a recommendation on the product based on the integrated wishlist.

FIG. 33 are views illustrating a UI screen provided in the user terminal apparatus 100, 300 of the first user according to operations of the user terminal apparatus 600 of the second user.

As illustrated in the upper side of FIG. 33, a popup window 620 that includes a message indicating whether the second user recommended the product added to the integrated wishlist and an OK button 621 may be displayed. When the user has seen the message, the user may select the OK button 621 and remove the popup window 620.

In addition, as illustrated in the lower side of FIG. 33, in a case where the second user has sent an evaluation opinion regarding the product added to the integrated wishlist, a popup window 650 including a message indicating the user's opinion may be displayed.

Figure 34:
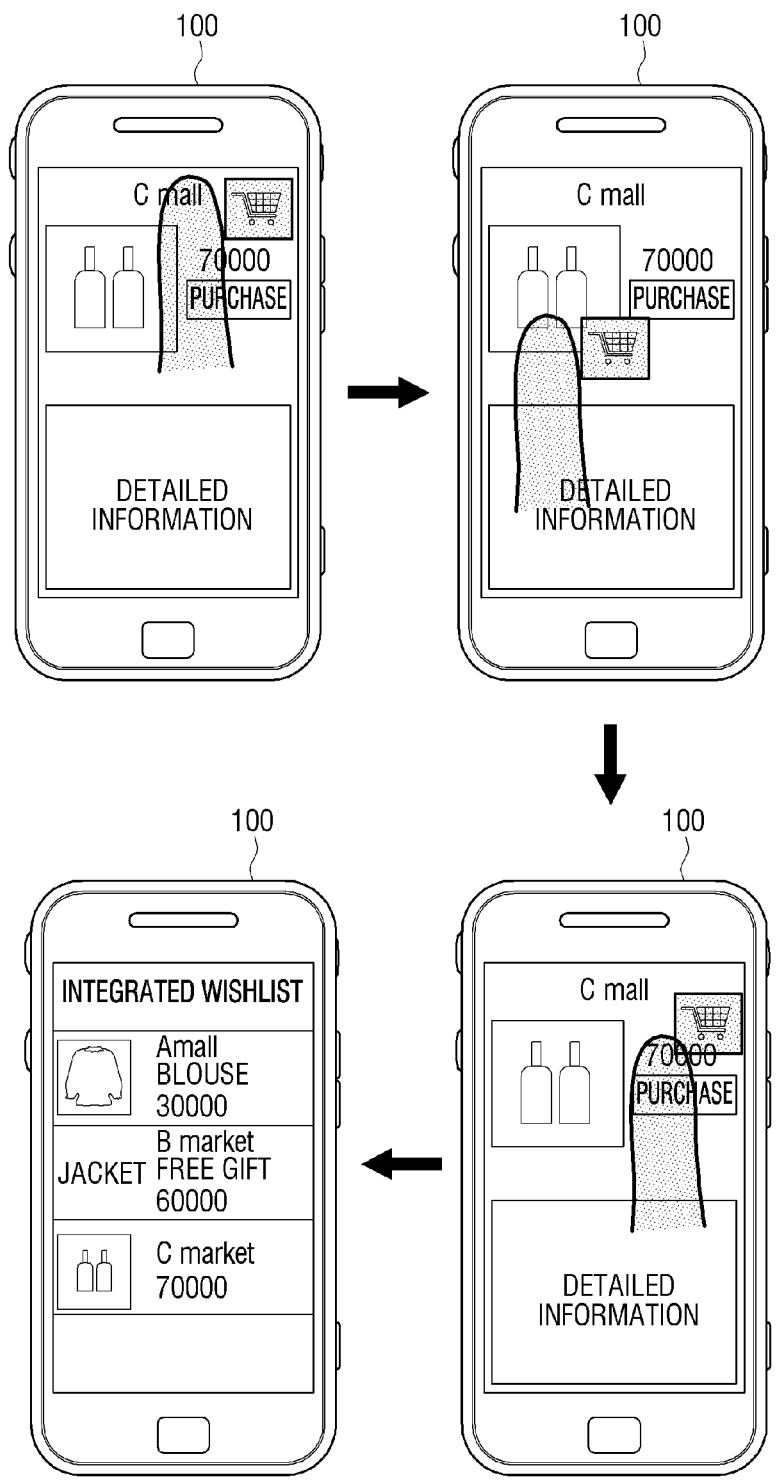

FIG. 34 is a view for explaining a UI screen according to an exemplary embodiment.

As illustrated in FIG. 34, on the web page, only the information selected by the user may be added to the integrated wishlist.

In a case where the user selects the text "Cmall", followed by selection of the "cosmetics" image, followed by the text "70000", only the selection information may be recorded in the integrated wishlist. Accordingly, when different information is selected in different shopping malls, information on the products contained in the integrated wishlist may have various formats. Alternatively, when the user selects a product, all product information associated with the product and the source of the product may be obtained.

Figure 35:
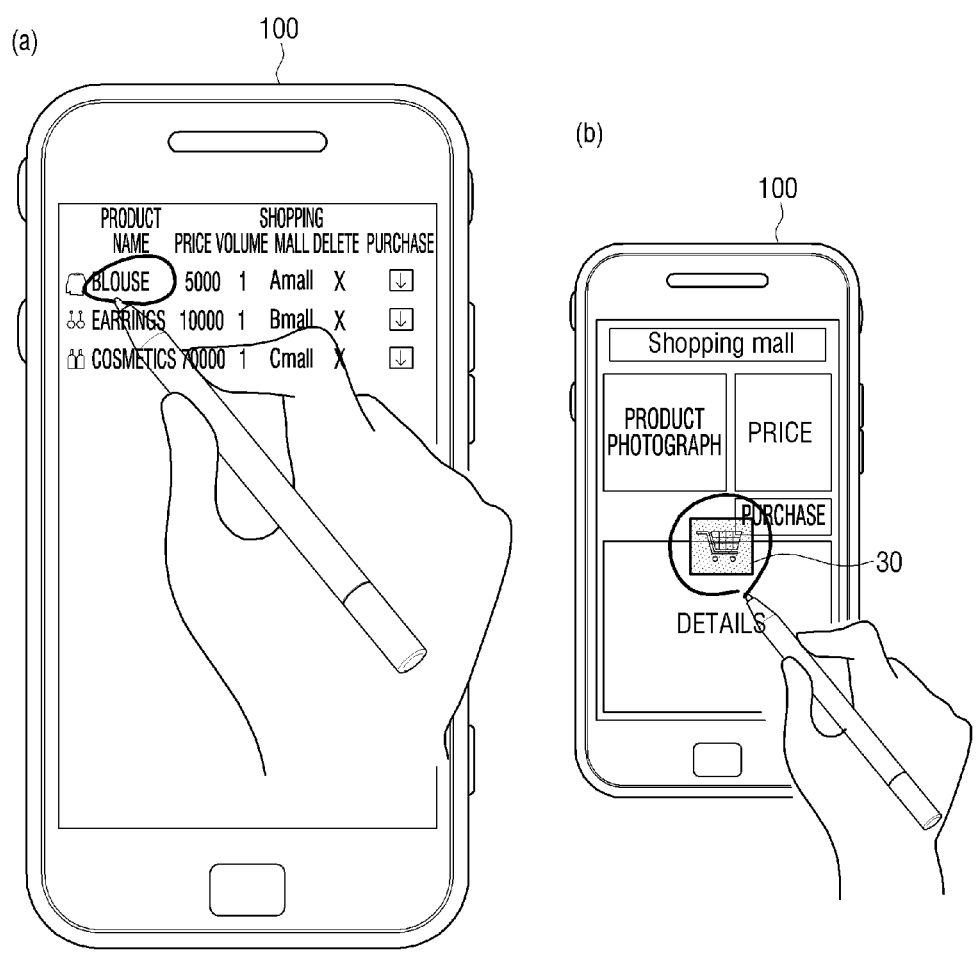
Figure 36:
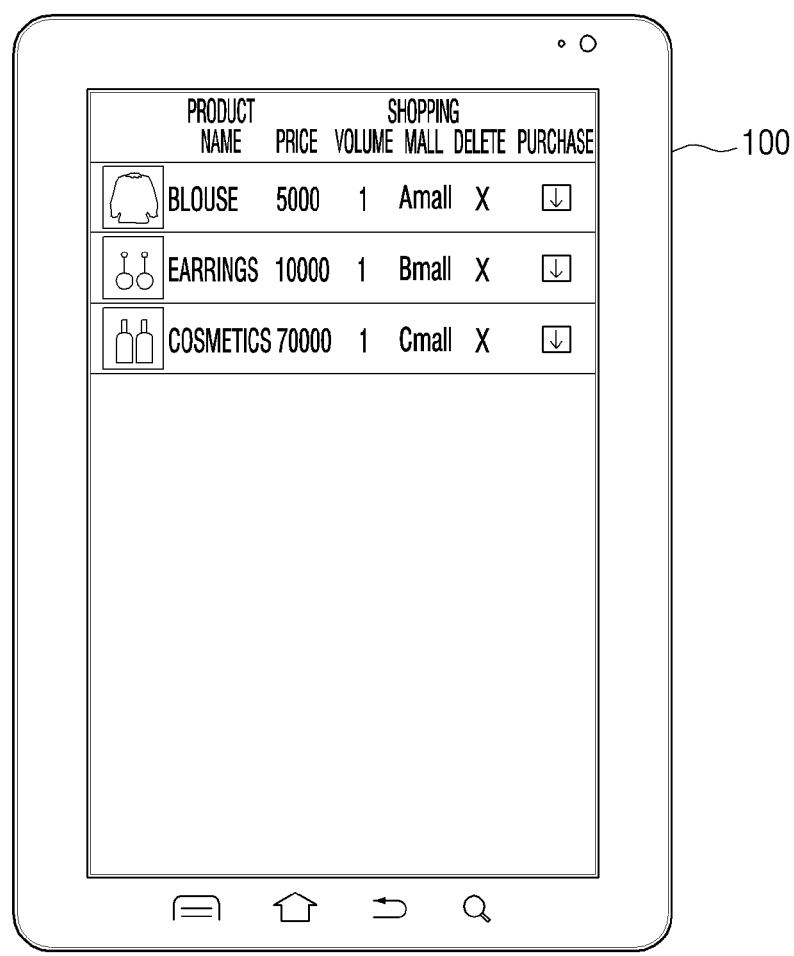

FIGS. 35 and 36 are views for explaining a UI screen according to exemplary embodiments.

As illustrated in FIG. 35(a), in a case where the user terminal apparatus 100 uses a stylus pen as an input device, a selecting command may be input by drawing a characteristic pattern. Herein, a stylus pen (also called as a PDA pen) refers to a computer input apparatus used to write text or draw. When the characteristic pattern is detected, the product associated with the characteristic pattern, and any associated product or source information, may be added to the integrated wishlist.

In addition, as illustrated in FIG. 35(b), a product may be added to the integrated wishlist by drawing a figure or a characteristic pattern around the wishlist icon. Accordingly, a product displayed on a web page may be added to the integrated wishlist when the characteristic pattern associated with the wishlist icon 30 is detected.

FIG. 36 illustrates a format where the integrated wishlist is displayed on a tablet PC. A tablet PC has a screen which is larger than a general mobile phone, and thus information on the products recorded in the integrated wishlist may be displayed in a format different than a format displayed on general mobile phone. For example, a bigger product image may be displayed. Accordingly, the integrated wishlist may be displayed to the user according to a screen size.

Figure 37:
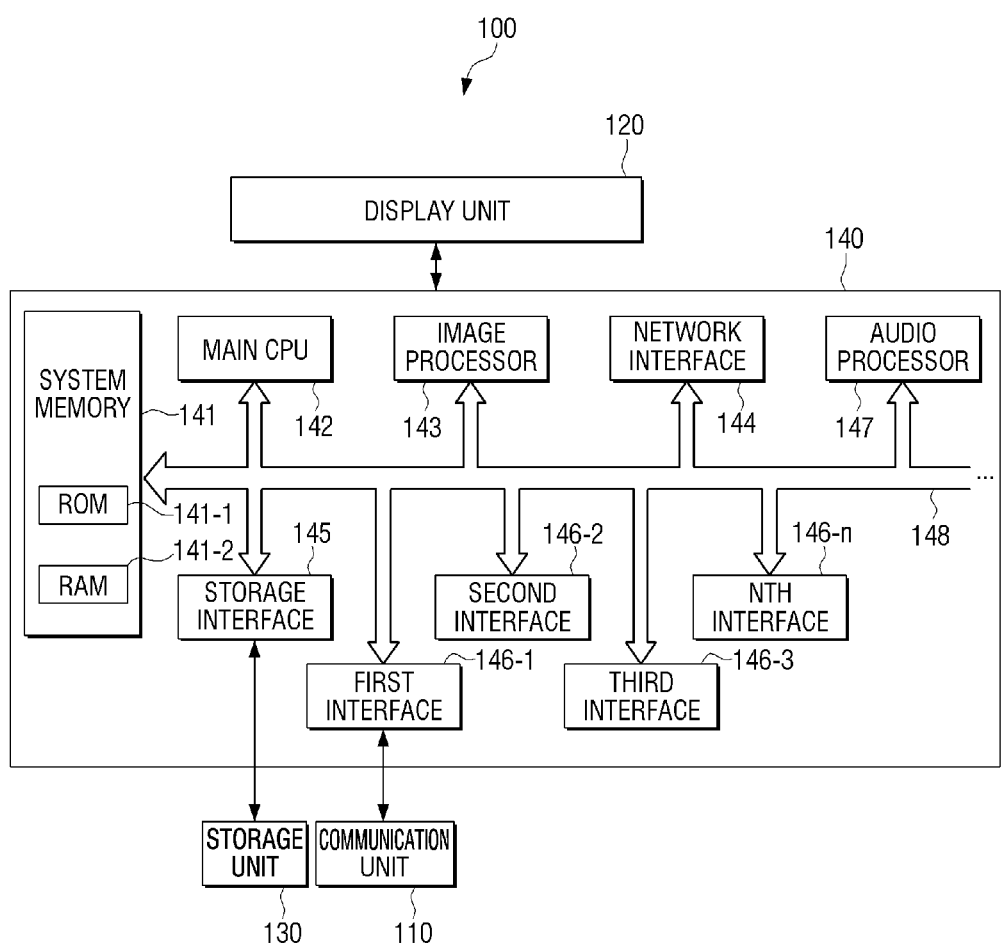
FIG. 37 is a view for explaining a detailed configuration of a control unit according to an exemplary embodiment.

FIG. 37 is a view for explaining a detailed configuration of a control unit 140 of a user terminal apparatus 100 according to an exemplary embodiment. The detailed configuration of the control unit 140 may be applied to other control units 350, 470, 560.

According to FIG. 37, the control unit 140 includes a system memory 141, a main CPU 142, an image processor 143, a network interface 144, a storage unit interface 135, first to nth interfaces **146-1~146-*n*, an audio processor 147, and a system bus 148**.

The system memory 141, main CPU 142, image processor 143, network interface 144, storage unit interface 145, first to nth interfaces **146-1~146-*n*, audio processor 147 are connected to one another through the system bus 148**, and may transmit or receive various data or signals.

First to nth interfaces **146-1~146-*n* support interfacing between various elements of the display unit 110 and elements within the control unit 140. In addition, at least one of the first to nth interfaces 146-1~146-*n*** may be embodied as an input interface which receives various signals from an external device through external input ports or a button provided in a body portion of the user terminal apparatus.

The system memory 141 includes a ROM 141-1 and RAM 141-2. In ROM 141-1, software for system booting is stored. When power is supplied, the main CPU 142 copies the O/S stored in the storage unit 130 to RAM 141-2 according to a command stored in the ROM 141-1, and executes the O/S to boot the system. When the booting is completed, the main CPU 142 copies various application programs stored in the storage unit 130 to RAM 141-2, and executes the application program copied to the RAM 141-2, to perform various operations.

As aforementioned, the main CPU 142 may perform various operations according to the execution of the application program stored in the storage unit 130.

The storage unit interface 145 is connected to the storage unit 130 and transfers various programs and contents data.

For example, when the user performs an input, the main CPU 142 accesses the storage unit 130 through the storage unit interface 145

For example, when the user performs a touch manipulation corresponding to a command for executing the integrated wishlist application stored in the storage unit 130, the main CPU 142 accesses the storage unit 130 through the storage unit interface 145, creates a UI screen corresponding to the stored integrated wishlist application, and displays the integrated wishlist application on the display unit 110.

The image processor 143 may include a decoder, renderer and scaler. Accordingly, the image processor 143 decodes contents, renders the decoded contents data to form a frame, and scales the size of the formed frame to fit the size of the screen of the display unit 110. The image processor 143 provides the processed frame to the display unit 110 and displays the processed frame, For example, the image processor may scale web page data received from the shopping mall web server to fit the size of the screen of the display unit 110.

The audio processor 147 refers to an element that processes audio data and provides the processed audio data to a sound output means, such as a speaker 180. The audio processor 147 may perform audio signal processing, such as decoding audio data received from outside or audio data stored in the storage unit 130, noise-filtering of the audio data, and then amplifying the audio data to an appropriate decibel. The audio processor 147 may process demultiplexed audio data from the video contents and provide the demultiplexed audio data to the speaker 180 so that the audio data may be synchronized with the image processor 143 and be output. For example, the audio processor 147 may perform audio signal processing so that notifying according to the various exemplary embodiments of the present disclosure may be provided in a sound notification format.

The network interface 144 is a portion which is connected with external devices through the network. For example, when a web browser program is executed, the main CPU 142 accesses the web server through the network interface 134. When a web page data is received from the web server, the main CPU 142 controls the image processor 143 to generate a web page screen, and displays the generated web page screen on the display unit 110. For example, the network interface 144 may access the shopping mall web server and receive the web page data according to the user command.

Meanwhile, operations of the aforementioned control unit 140 may be embodied by executing various programs stored in the storage unit 130.

Figure 38:
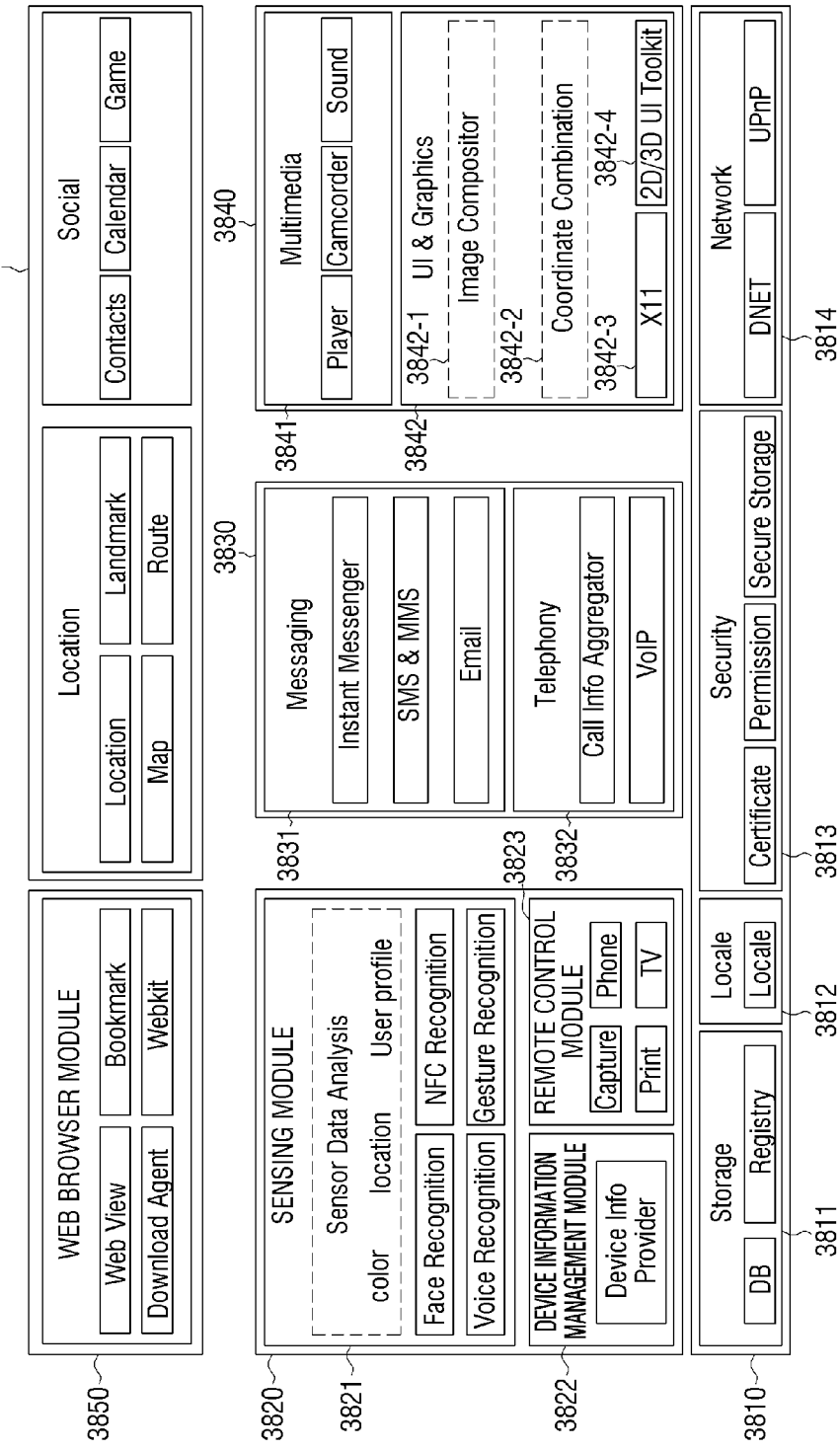
FIG. 38 is a view illustrating a software structure of a storage unit 130 for supporting an operation of a control unit 140 according to exemplary embodiments.

FIG. 38 is a view illustrating a software structure of the storage unit 130 for supporting operations of the control unit 140 according to the aforementioned various exemplary embodiments. According to FIG. 38, the storage unit 130 includes a base module 3810, device management module 3820, communication module 3830, presentation module 3840, web browser module 3850, and service module 3860.

The base module 3810 refers to a basic module that processes a signal transmitted from each hardware included in the user terminal apparatus 100 and transmits the transmitted signal to a superior layer module.

The base module 3810 includes a storage module 3811, location based module 3812, security module 3813, and network module 3814.

The storage module 3811 is a program module that manages a database DB or registry. The location based module 3812 is a program module which is interlocked to a hardware such as GPS chip and supports a location based service. The security module 3813 is a program module which supports certification, request permission, and secure storage etc. regarding a hardware, and the network module 3814 is a module for supporting network connection, and includes a DNET module and UPnP module. For example, through the network module 3814, network connection with the server 200, shopping mall server 20, and display apparatus 400 may be performed.

The device management module 3820 is a module for managing information on an external input and external device, and for using such information. The device management module 3820 may include a sensing module 2812, device information management module 3822, and remote control module 3823 etc. For example, through the device management module 3820, information on the server 200 and the display apparatus 400 etc. may be managed.

The sensing module 3821 is a module for analyzing various sensor data. For example, the sensing module 3821 may include a face recognition module, sound recognition module, motion recognition module, and NFC recognition module. The device information management module 3822 is a module that provides information on various devices, and the remote control module 3823 is a program module that performs operations of remote controlling peripheral devices such as a telephone, TV, printer, camera, and air conditioner.

The communication module 3830 is a module for performing communication with outside. The communication module 3830 may include a messaging module 3831, such as a messenger program, SMS (Short Message Service) & MMS (Multimedia Message Service) program, and email program etc., a Call Info Aggregator program module, and a telephone module 3832 which includes a VoIP module etc. For example, through the communication module 3830, various notice messages and email services related to the integrated wishlist service may be provided.

The presentation module 3840 is a module for configuring a display screen. The presentation module 3840 includes a multimedia module 3841 for replaying and outputting multimedia contents, and a UI & graphic module 3842 which performs UI and graphic processing. The multimedia module 3841 may include a player module, camcorder module, and sound processing module. Accordingly, the presentation module performs an operation of replaying various multimedia contents, generating a screen and sound, and replaying the screen and sound. The UI & graphic module 3842 may include an image compositor module 3842-1 which combines images, a coordinate combination module 3842-2 that combines a coordinate of a screen where an image is to be displayed, an X11 module 3842-3 that receives various events from hardware, and a 2D/3D UI toolkit 3842-4 that provides a tool for configuring a UI of 2D or 3D format. For example, through the UI & graphic module 3842, it becomes possible to display the wishlist icon on the web page, or change the wishlist icon in various formats and the display the changed wishlist icon.

The web browser module 3850 refers to a module which performs web browsing and accesses the web server. The web browser module 3850 may include various modules, such as a web view module which configures a web page, a download agent module which performs downloading, a bookmark module, and a Webkit module. For example, through the web browser module 3850, it becomes possible to configure a shopping mall web page.

Besides the above, the service module 3860 refers to an application module for providing various services. For example, the service module 3860 may include various modules such as a navigation service module which provides information on the current location, landmark and route information, a game module, and an advertisement application module. For example, through the navigation service module, it becomes possible to provide various offline services related to the aforementioned integrated wishlist service.

The main CPU 142 inside the control unit 140 accesses the storage unit 130 through the storage unit interface 145, copies various modules stored in the storage unit 130 to the RAM 141-2, and performs operations according to the operation of the copied module.

For example, in a case of a GUI (Graphic User Interface) display operation, the main CPU 142 uses the image combination module 3842-1 inside the presentation module 3840 to configure the GUI screen. In addition, the main CPU 142 controls the display unit 120 to determine the display location of the GUI screen and to display the GUI screen on the determined display location using the coordinate combination module 3842-1. For example, the main CPU 142 may control the display unit 120 to display the wishlist icon.

Otherwise, in a case where a user manipulation corresponding to a message receiving operation is made, the main CPU 142 executes the messaging module 3841, accesses the message management server, and receives the message stored in the user account. In addition, the main CPU 142 uses the presentation module 3840 to configure the screen corresponding to the received message, and displays the screen on the display unit 120. For example, the main CPU may receive a message such as friend's evaluation information on the integrated wishlist service and configure a corresponding screen.

Besides the above, in a case of performing a telephone call operation, the main CPU 132 may drive the telephone module 2832.

As aforementioned, programs of various structures may be stored in the storage unit, and the control unit 140 may use various programs stored in the storage unit 130 to perform operations according to various aforementioned exemplary embodiments.

Figure 39:
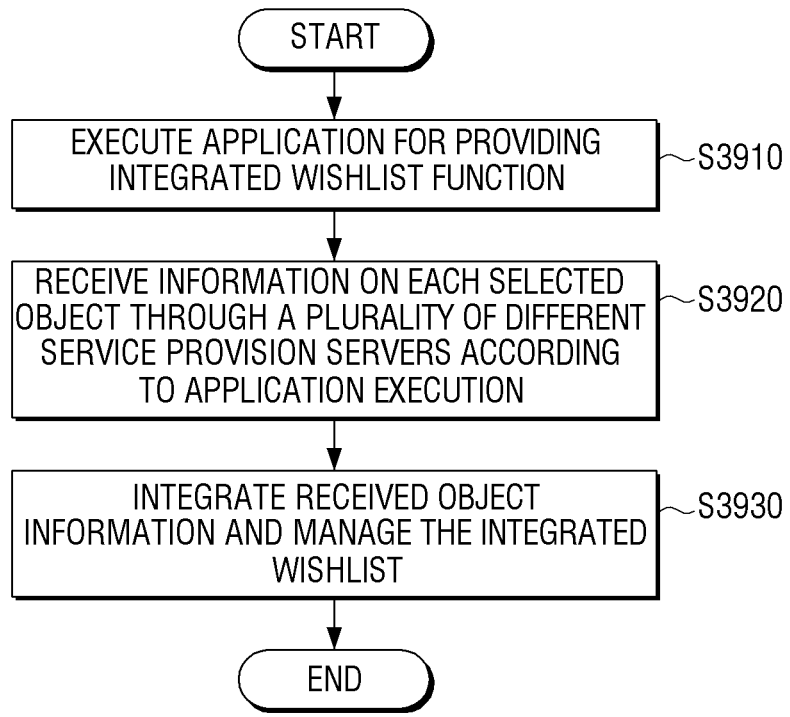
FIG. 39 is a flowchart of a method for controlling a user terminal apparatus according to an exemplary embodiment.

FIG. 39 is a flowchart of a method of controlling a user terminal apparatus according to an exemplary embodiment.

According to a method of controlling the user terminal apparatus illustrated in FIG. 39, the user terminal apparatus executes the application for providing the integrated wishlist function (S3910).

Next, information on each selected object is received through a plurality of service provision servers as the application is executed (S3920). Herein, the plurality of service provision servers may be a plurality of electronic commerce servers. For example, first information on a first product may be received from a first electronic commerce server and second information on a second product may be received from a second electronic commerce server.

Next, the received object information is integrated and managed the integrated wishlist (S3930). In this case, the received object information may be transmitted to the server that manages the integrated wishlist so that the received object information may be managed in the server.

When a service provision screen provided through the plurality of different service provision servers is displayed, a menu regarding the integrated wishlist may be added to the service provision screen. Herein, the menu regarding the integrated wishlist is displayed in an icon format, and the icon may be interlocked to a user's touch operation on the display screen and be displayed. In addition, the icon may be changed into a format corresponding to the information of the object added to the integrated wishlist and be displayed.

When at least one object is selected through a purchase request menu provided in the integrated wishlist function, a purchase request for the corresponding object may be transmitted to the service provision server corresponding to the selected object.

When a predetermined event occurs (for example periodically), a request may be made for information on the object recorded in the integrated wishlist, and product information may be updated.

When at least one object is selected through a purchase request menu regarding the integrated wishlist, a request may be made for information on the corresponding object to the service provision server. Next, when the information on the selected object recorded in the integrated wishlist and the information received according to the request does not correspond to each other, corresponding contents may be output.

The user terminal may perform communication with an external display apparatus. In this case, the integrated wishlist function is provided in the external display apparatus as the application is executed.

When the service provision screen provided through the plurality of different service provision servers are displayed in the external display apparatus, a menu regarding the integrated wishlist may be added on the service provision screen.

When there is a request periodically or from the server, the service provision server may check information on the object recorded in the integrated wishlist, and if there is changed information, the service provision server may provide updated product information to the server.

Figure 40:
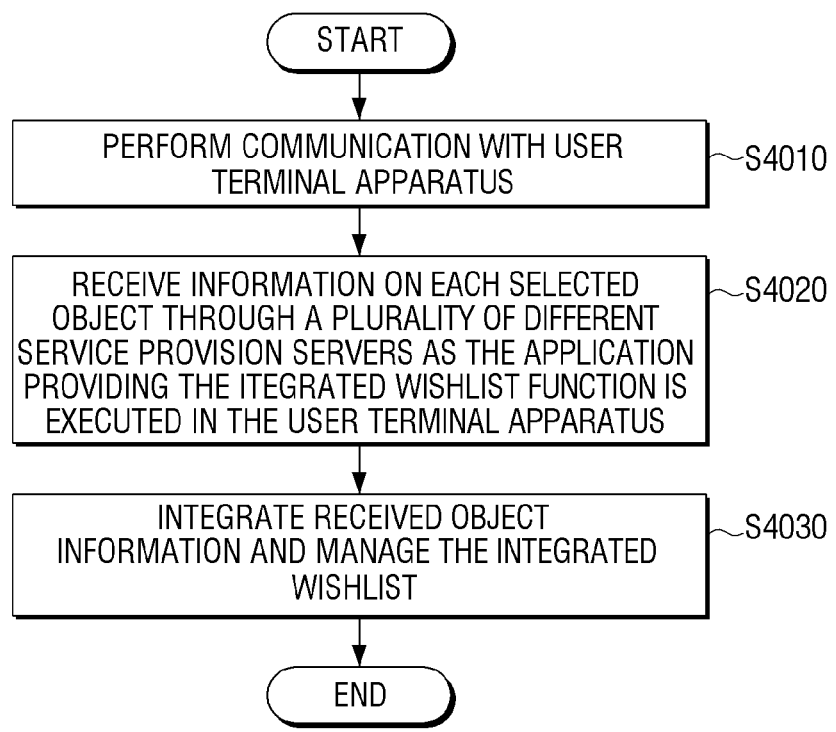
FIG. 40 is a flowchart of a method for controlling a display apparatus according to an exemplary embodiment.

FIG. 40 is a flowchart of a method of controlling the display apparatus according to an exemplary embodiment.

According to the method of controlling the display apparatus illustrated in FIG. 40, the display apparatus performs communication with the user terminal apparatus (S4010).

Next, information on each selected object is received through a plurality of different service provision servers as the application providing the integrated wishlist function is executed in the user terminal apparatus (S4020).

Next, the received object information is integrated and managed as the integrated wishlist (S4030).

When the service provision screen provided through the plurality of different service provision servers is displayed, it is possible to display an object that indicates that the integrated wishlist is active on the service provision screen. In this case, the object is displayed in an icon format, and the icon may be interlocked to the cursor displayed on the display screen and be displayed.

The icon may be changed into a corresponding format according to information on the object added to the integrated wishlist and be displayed.

When at least one object is selected through a purchase request menu regarding the integrated wishlist, it is possible to request the service provision server for information on the corresponding object. In a case where the information on the selected object recorded in the integrated wishlist and the information received according to the request does not correspond to each other, corresponding contents may be output.

Figure 41:
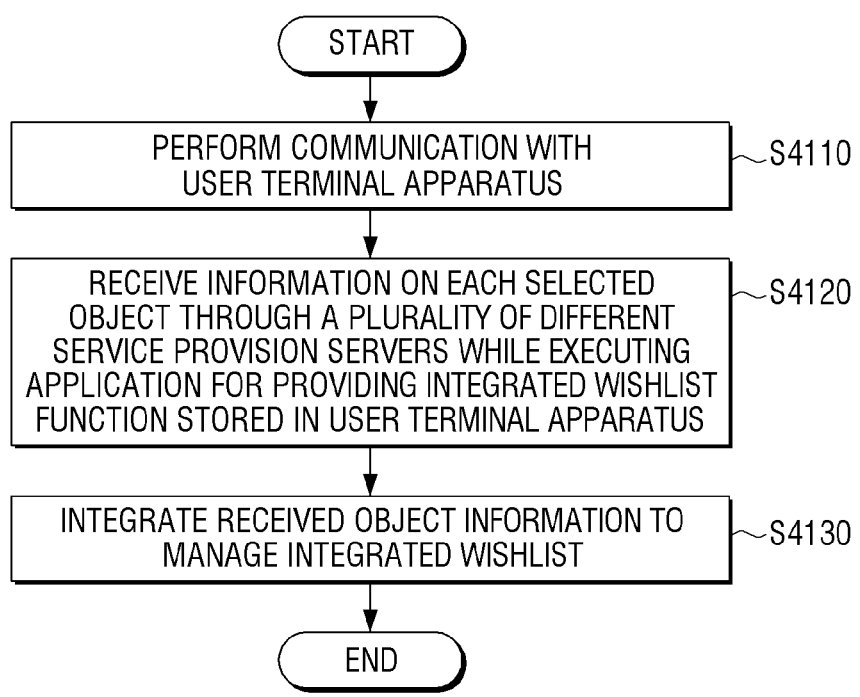
FIG. 41 is flowchart of a method for controlling a server according to an exemplary embodiment.

FIG. 41 is a flowchart of a method of controlling a server according to an exemplary embodiment.

According to a method of controlling the server illustrated in FIG. 41 communication is performed with the user terminal apparatus (S4110).

Next, information on each selected object is received through a plurality of different service provisions servers as the application for providing the integrated wishlist function stored in the user terminal apparatus is executed (S4120).

Next, the received object information is integrated and the integrated wishlist is managed (S4130).

When a service provision screen provided through the plurality of different service provision servers is displayed in the user terminal apparatus or the display apparatus interlocked to the user terminal apparatus, an object which indicates that the integrated wishlist is active may be displayed on the service provision screen.

When at least one object is selected through the purchase request menu provided in the integrated wishlist function, a purchase request may be transmitted to the service provision server corresponding to the selected object.

When at least one object is selected through the purchase request menu regarding the integrated wishlist, a request for information on the selected object may be made to the service provision server. Next, when the information on a selected object does not correspond to the information on the object provided in the service provision server at the point where the purchase request menu has been selected, updated product information may be provided to the user terminal apparatus.

When a predetermined event occurs, a request may be made for information on the object recorded in the integrated wishlist to the service provision server, and updated product information may be obtained and the integrated wishlist may be updated.

When at least one object is selected through the purchase request menu regarding the integrated wishlist, the settlement page regarding the object maybe provided, or the user may be connected to the settlement page provided in the service provision server.

Accordingly, products provided through a plurality of shopping mall sites may be managed through one application.

Meanwhile, in the aforementioned exemplary embodiment, only the integrated wishlist function was explained, but the exemplary embodiments are equally applicable to a basket or shopping cart function similar to the wishlist function. Accordingly, a user may purchase items from a variety of electronic commerce web sites using a single application.

The method of controlling the user terminal apparatus, display apparatus and server according to the aforementioned present disclosure may be otherwise utilized in the electronic commerce field as well.

The aforementioned various exemplary embodiments may be embodied by merely updating the software of existing device and user terminal apparatus.

The exemplary embodiments may be embodied as a computer-readable program recorded on a non-transitory computer readable medium where a the program performs the functions and the control method discussed above.

The non-transitory computer readable medium refers to a computer readable medium which stores data semi-permanently, and not a medium which stores data for short period of time such as a register, cache, and memory etc. More specifically, the aforementioned various applications or programs may be stored and provided in a non-transitory computer readable medium such as a CD, DVD, hard disk, blue-ray disk, USB, memory card, and ROM etc.

In addition, although not illustrated elements of the user terminal apparatus, display apparatus and server may be connected through a bus. In addition, a processor such as a CPU, and microprocessor etc. which performs the various aforementioned steps in each device may further be included.

Although a few exemplary embodiments have been shown and described, it would be appreciated by those skilled in the art that changes may be made in the exemplary embodiments without departing from the principles and spirit of the invention, the scope of which is defined in the claims and their equivalents.

What is claimed is:

1. A user terminal apparatus comprising:
a display;
a first communication interface;
a second communication interface; and
a processor configured to:
control the user terminal apparatus to receive a first input for selecting a first item on the display of the user terminal apparatus, control the first communication interface to receive, from at least one server, first information about a price of a first product corresponding to the first item, search for an external display apparatus, display a list of discovered external display apparatuses as a result of the search on the display, in response to one of the discovered external display apparatuses being selected, connect the user terminal apparatus with the selected external display apparatus, control the display to provide an integrated wishlist based on the first information, in response to receiving a second input for selecting of a second item on a display of the selected external display apparatus, control the second communication interface to receive, from the selected external display apparatus, second information about the second item, control the first communication interface to obtain, from a website, third information about a price of a second product corresponding to the second item based on the second information, and update the integrated wishlist based on the third information and control the display to provide the updated integrated wishlist, wherein the processor is further configured to update the integrated wishlist according to a change of the first information about the price of the first product and a change of the third information about the price of the second product.

2. The user terminal apparatus according to claim 1, wherein the integrated wishlist is a compilation of the first information about the first product and the third information about the second product configured in a list.

3. The user terminal apparatus according to claim 2, wherein the first item is selected from a first electronic commerce website and the second item is selected from a second electronic commerce website.

4. The user terminal apparatus according to claim 3, wherein the first item is selected by the user navigating to the first electronic commerce website and adding the first item to the integrated wishlist and the second item is selected by the user navigating to the second electronic commerce website and adding the second item to the integrated wishlist.

5. The user terminal apparatus according to claim 4, wherein the processor is further configured to control the display to display the integrated wishlist.

6. The user terminal apparatus according to claim 5, wherein the processor is further configured to receive a request to purchase the first product and the second product displayed in the integrated wishlist.

7. The user terminal apparatus according to claim 6, wherein the processor is further configured to process payment of the first product through the first electronic commerce website and process payment of the second product through the second electronic commerce website.

8. The user terminal apparatus according to claim 3, wherein the processor is further configured to receive a first associative input that associates the first product with a wishlist icon, add the first product to the integrated wishlist in response to receiving the first associative input, receive a second associative input that associates the second product with the wishlist icon, and add the second product to the integrated wishlist in response to receiving the second associative input.

9. The user terminal apparatus according to claim 8, wherein the first associative input is a drag input that drags the first product to the wishlist icon and the second associative input is a drag input that drags the second product to the wishlist icon.

10. The user terminal apparatus according to claim 8, wherein the first associative input is a drag input that drags the wishlist icon to the first product and the second associative input is a drag input that drags the wishlist icon to the second product.

11. The user terminal apparatus according to claim 3, wherein the processor is further configured to receive a first selective input that selects the first product from the first electronic commerce website, add the first product to the integrated wishlist if the first item is available to be selected for inclusion in the integrated wishlist in response to receiving the first selective input, receive a second selective input that selects the second product from the second electronic commerce website, and add the second product to the integrated wishlist if the first item is available to be selected for inclusion in the integrated wishlist in response to receiving the second selective input.

12. A method of providing an integrated wishlist, the method comprising:

receiving a first input for selecting a first item on a display of a user terminal apparatus;

receiving, from at least one server, first information about a price of a first product corresponding to the first item;

searching for an external display apparatus;

displaying a list of discovered external display apparatuses as a result of the searching on the display;

in response to one of the discovered external display apparatuses being selected, connecting the user terminal apparatus with the selected external display apparatus;

displaying an integrated wishlist based on the first information;

in response to receiving a second input for selecting of a second item on a display of the selected external display apparatus, receiving, from the selected external display apparatus, second information about the second item through a second communication interface of the user terminal apparatus;

controlling a first communication interface to obtain, from a website, third information about a price of a second product corresponding to the second item based on the second information;

updating the integrated wishlist based the third information and displaying the updated integrated wishlist; and wherein the integrated wishlist is updated according to a change of the first information about the price of the first product and a change of the third information about the price of the second product.

13. The method according to claim 12, wherein the integrated wishlist is a compilation of the first information about the first product and the third information about the second product configured in a list.

14. The method according to claim 13, wherein the first item comprises a first item is selected from a first electronic commerce website and the second item is selected from a second electronic commerce website.

15. The method according to claim 14, wherein the first product is associated with a wishlist icon using a first associative input, the second product is associated with the wishlist icon using a second associative input, and wherein the method further comprises:

adding the first product to the integrated wishlist in response to receiving the first associative input; and adding the second product to the integrated wishlist in response to receiving the second associative input.

16. The method according to claim 15, wherein the first associative input is a drag input that drags the first product to the wishlist icon and the second associative input is a drag input that drags the second product to the wishlist icon.

17. The method according to claim 15, wherein the first associative input is a drag input that drags the wishlist icon to the first product and the second associative input is a drag input that drags the wishlist icon to the second product.

18. The method according to claim 13, further comprising displaying the integrated wishlist.

19. The method according to claim 18, further comprising:
    receiving a request to purchase the first product and the second product displayed in the integrated wishlist.

20. The method according to claim 19, further comprising:
    processing payment of the first product through the first electronic commerce website; and
    processing payment of the second product through the second electronic commerce website.

21. A non-transitory computer-readable medium having embodied thereon a computer program that causes a user terminal apparatus to execute a method of providing an integrated wishlist function, the method comprising:
    receiving a first input for selecting a first item on a display of the user terminal apparatus;
    receiving, from at least one server, first information about a price of a first product corresponding to the first item;
    searching for an external display apparatus;
    displaying a list of discovered external display apparatuses as a result of the search on the display;
    in response to one of the discovered external display apparatuses being selected, connecting the user terminal apparatus with the selected external display apparatus;
    displaying an integrated wishlist based on the first information;
    in response to receiving a second input for selecting a second item on a display of the selected external display apparatus, controlling a second communication interface of the user terminal apparatus to receive, from the selected external display apparatus, second information about the second item;
    controlling a first communication interface to obtain, from a website, third information about a price of a second product corresponding to the second item based on the second information; and
    updating the integrated wishlist based on the third information and displaying the updated integrated wishlist,
    wherein the integrated wishlist is updated according to a change of the first information about the price of the first product and a change of the third information about the price of the second product.

* * * * *